United States Patent
Furuya

(10) Patent No.: US 9,664,886 B2
(45) Date of Patent: May 30, 2017

(54) MICROSCOPE TUBE LENS, MICROSCOPE APPARATUS AND IMAGE PICKUP OPTICAL SYSTEM

(71) Applicant: OLYMPUS CORPORATION, Shibuya-ku, Tokyo (JP)

(72) Inventor: Yo Furuya, Kamiina (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/875,134

(22) Filed: Oct. 5, 2015

(65) Prior Publication Data
US 2016/0103308 A1    Apr. 14, 2016

(30) Foreign Application Priority Data
Oct. 8, 2014 (JP) ................ 2014-207624

(51) Int. Cl.
| | | |
|---|---|---|
| *G02B 21/00* | (2006.01) | |
| *G02B 21/02* | (2006.01) | |
| *G02B 9/14* | (2006.01) | |
| *G02B 21/36* | (2006.01) | |

(52) U.S. Cl.
CPC ............. *G02B 21/02* (2013.01); *G02B 9/14* (2013.01); *G02B 21/361* (2013.01)

(58) Field of Classification Search
CPC ... G02B 9/00; G02B 9/12; G02B 9/14; G02B 9/30; G02B 9/60; G02B 15/173; G02B 15/28; G02B 21/00; G02B 21/361
USPC ....... 359/362, 363, 368, 379, 380, 432, 434, 359/435, 642, 676, 683, 689, 690, 754, 359/763, 784, 785, 786, 787, 788
See application file for complete search history.

(56) References Cited

U.S. PATENT DOCUMENTS

| | | | | |
|---|---|---|---|---|
| 4,497,546 A | * | 2/1985 | Kobayashi ............. | G02B 25/04 359/644 |
| 5,175,652 A | | 12/1992 | Shimizu | |
| 5,383,058 A | * | 1/1995 | Yonezawa ............ | G02B 15/173 359/380 |
| 7,362,511 B2 | * | 4/2008 | Suzuki ................. | G02B 15/173 359/380 |
| 2012/0281082 A1 | | 11/2012 | Kawasaki | |

FOREIGN PATENT DOCUMENTS

| | | | |
|---|---|---|---|
| JP | 58181012 A | * | 10/1983 |
| JP | 04093911 A | | 3/1992 |
| JP | 2012234056 A | | 11/2012 |

* cited by examiner

*Primary Examiner* — Arnel C Lavarias
(74) *Attorney, Agent, or Firm* — Holtz, Holtz & Volek PC

(57) ABSTRACT

A tube lens for a microscope includes, in the order from an object, a first lens group that has positive power and that includes a cemented lens, a second lens group that has negative power, and a third lens group has positive power. The tube lens satisfies the following condition expressions, where NA is a numerical aperture on an image side of the tube lens, FN is a field number of the tube lens, and $\epsilon$ is an airy disk diameter with respect to d line of the tube lens (588 nm):

0.04<NA; and

1700≤FN/$\epsilon$.

17 Claims, 19 Drawing Sheets

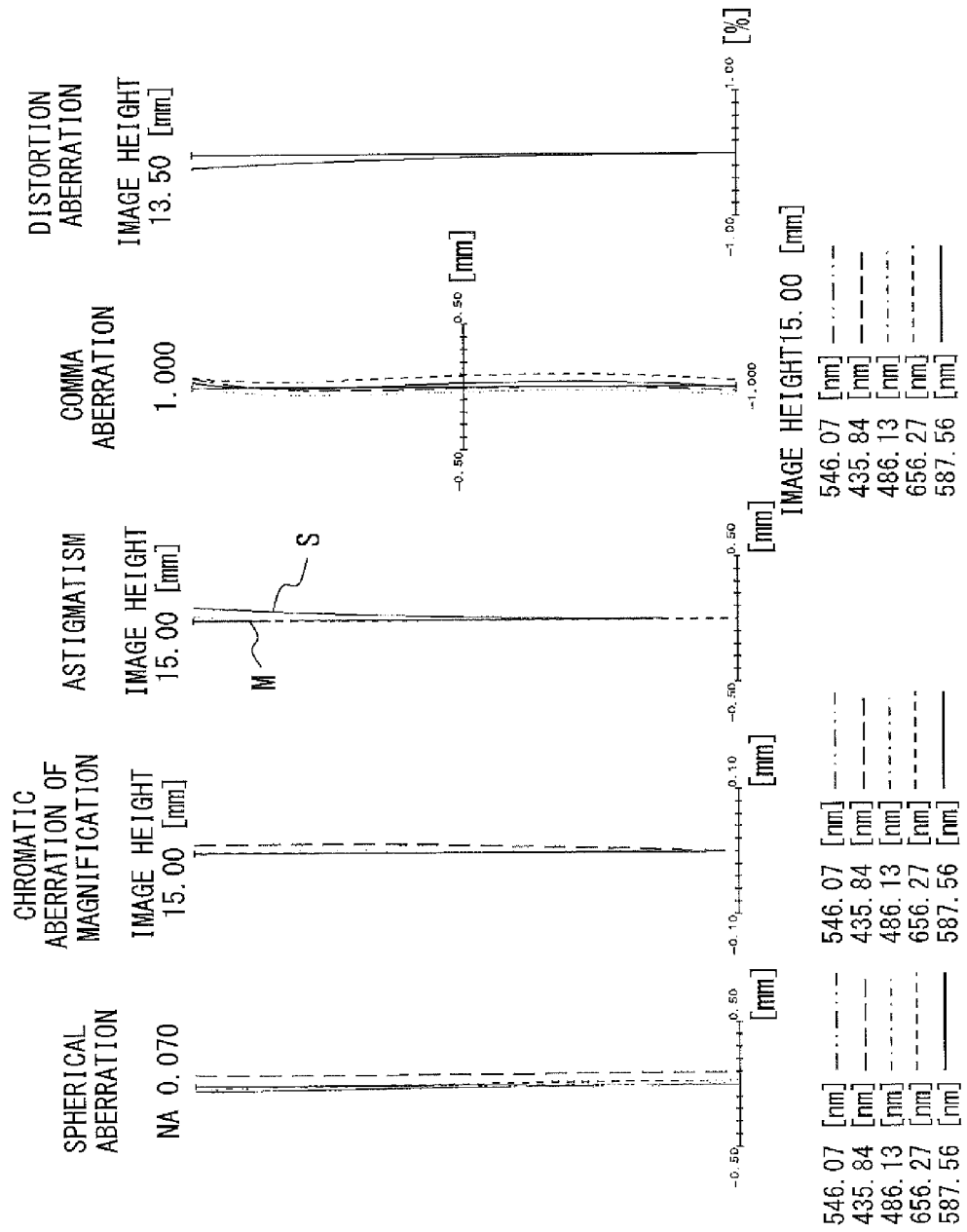

MICROSCOPE TUBE LENS, MICROSCOPE APPARATUS AND IMAGE PICKUP OPTICAL SYSTEM

CROSS REFERENCE TO RELATED APPLICATIONS

This application is based upon and claims the benefit of priority from prior Japanese Patent Application No. 2014-207624, filed Oct. 8, 2014, the entire contents of which are incorporated herein by this reference.

BACKGROUND OF THE INVENTION

Field of the Invention

The present invention is related to a microscope tube lens, a microscope apparatus and an image pickup optical system.

Description of the Related Art

In recent years, accompanying the remarkable increase in the number of pixels of an image pickup element, expectation has become higher for microscope apparatuses that realize observation and image acquisition with a wide field of view and high resolution. For example, when such a microscope apparatus is applied to the field of virtual slide, higher scanning speeds can be attained. Also, when such a microscope apparatus is applied to the fields of the brain research etc., observation is made possible in which cells are studied in detail while viewing the entire brain containing the cells in a real-time manner.

In order to realize such a microscope apparatus, an objective with a wide field of view is employed, and thus tube lenses that can sufficiently bring out the performance of such objectives are desired. A tube lens is described in for example Japanese Laid-open Patent Publication No. 04-093911.

SUMMARY OF THE INVENTION

An aspect of the present invention provides a microscope tube lens that forms an enlarged image of an object by being combined with an infinity-corrected objective, the tube lens including in an order from an object side a first lens group that has positive power and that includes a cemented lens, a second lens group that has negative power, and a third lens group that consists of a plurality of lenses each having positive power and that has positive power as a whole, wherein a following condition expression is satisfied, where FL is a focal length of the tube lens and D2 is a distance from a lens surface that is closest to the object in the tube lens to a position of an entrance pupil of the tube lens:

$0.3 < D2/FL < 1.3$.

Another aspect of the present invention provides a microscope apparatus including a microscope tube lens according to the aspect above.

Another aspect of the present invention provides an image pickup optical system including an infinity-corrected objective and a microscope tube lens, wherein the microscope tube lens includes in an order from an object side a first lens group that has positive power and that includes a cemented lens, a second lens group that has negative power, and a third lens group that consists of a plurality of lenses each having positive power and that has positive power as a whole, and a following condition expression is satisfied, where FL is a focal length of the tube lens and D2 is a distance from a lens surface that is closest to an object in the tube lens to a position of an entrance pupil of the tube lens:

$0.3 < D2/FL < 1.3$.

Another aspect of the present invention provides a microscope tube lens that forms an enlarged image of an object by being combined with an infinity-corrected objective, the tube lens including in an order from an object side a first lens group that has positive power and that includes a cemented lens, a second lens group that has negative power, and a third lens group that has positive power, wherein a following condition expression is satisfied, where NA is a numerical aperture on an image side of the tube lens, FN is a field number of the tube lens, and $\epsilon$ is an airy disk diameter with respect to d line (588 nm) of the tube lens:

$0.04 < NA$; and $1700 \leq FN/\epsilon$.

BRIEF DESCRIPTION OF THE DRAWINGS

The present invention will be more apparent from the following detailed description when the accompanying drawings are referenced.

FIG. 19A through FIG. 19E are aberration diagrams of the tube lens exemplified in FIG. 18, and respectively show a spherical aberration, a chromatic aberration of magnification, astigmatism, a comma aberration and a distortion aberration.

DESCRIPTION OF THE EMBODIMENTS

The tube lens described in Japanese Laid-open Patent Publication No. 04-093911 does not provide sufficient correction of field curvature or comma aberrations.

Accordingly, it is difficult to realize high resolution in the periphery portions of the field of view in a microscope apparatus having the tube lens. Also, higher numerical apertures tend to make more considerable the deterioration of performance caused by the off-axis aberration. This makes it difficult to realize both a wide field of view and high resolution.

In view of the above, the embodiments of the present invention will be explained.

Figure 1:
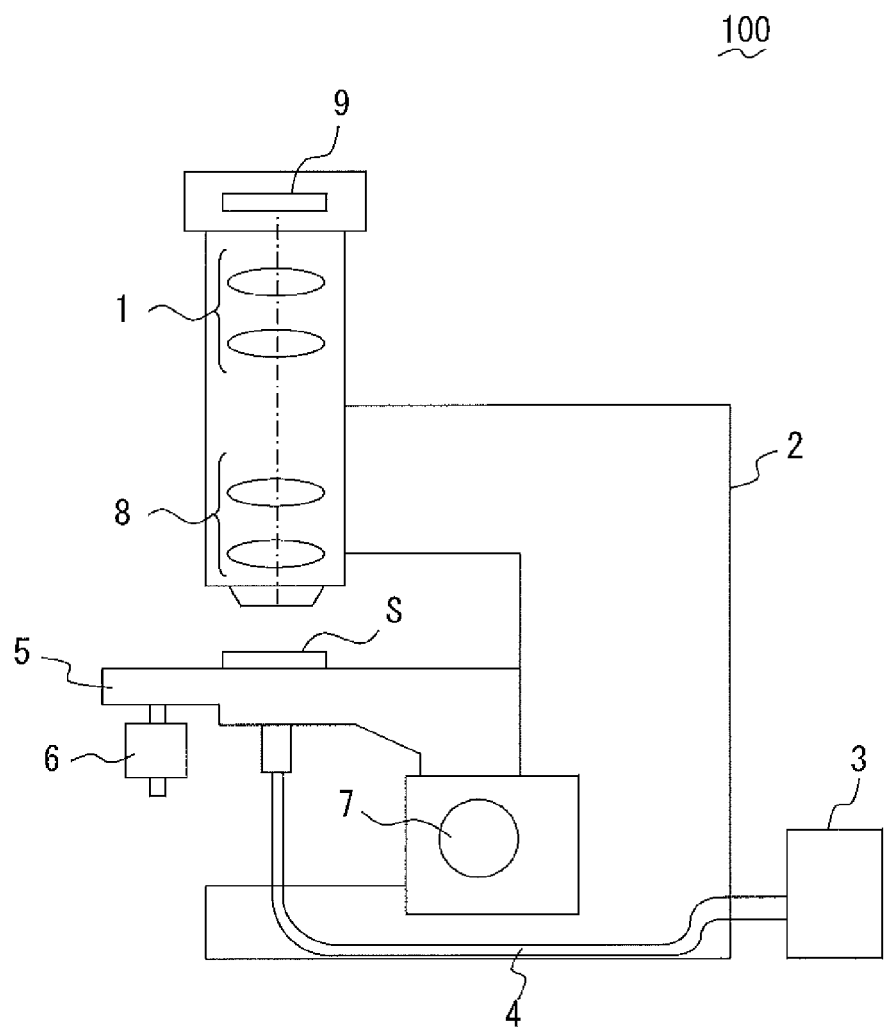
FIG. 1 exemplifies a microscope apparatus according to an embodiment of the present invention.

FIG. 1 is a schematic view showing a microscope apparatus 100 according to an embodiment of the present invention. The microscope apparatus 100 exemplified in FIG. 1 includes a microscope body 2, a light source device 3 connected to the microscope body 2 via an optical fiber 4, an image pickup optical system having an objective 8 and a tube lens 1, and a digital camera including an image pickup element 9. The microscope apparatus 100 further includes an X-Y handle 6 for moving a stage 5 in the directions orthogonal to the optical axis of the objective 8, and a Z handle 7 for moving the stage 5 in the directions parallel to the optical axis of the objective 8. Also, the microscope apparatus 100 may include an eyepiece, which is omitted in the drawings.

The objective 8 is an infinity-corrected microscope objective. The objective 8 is configured to have a wide field of view (i.e., low magnification and a high field number) and a high numerical aperture.

The tube lens 1 is a tube lens for a microscope (referred to as a microscope tube lens) that forms an enlarged image of an object (sample S) by being combined with the objective 8. The tube lens 1 is configured to provide god correction of aberrations and to have a wide field of view and a high numerical aperture.

The image pickup element 9 is for example a Charge Coupled Device (CCD), a Complementary Metal Oxide Semiconductor (CMOS), etc., and is arranged on an imaging plane on which an enlarged image is formed by the objective 8 and the tube lens 1.

It is desirable that the size of the image pickup element 9 be large so that the high field numbers of the objective 8 and the tube lens 1 are utilized sufficiently. It is also desirable that the image pickup element 9 be of high definition so that the high imaging performance of the objective 8 and the tube lens 1 are utilized sufficiently. It is desirable for example that the pixel size L (i.e., the length of one side of each pixel) of the image pickup element 9 be from 1µ through 1µ. One reason for this is that when the pixel size L is greater than 17µ, the Nyquist frequency becomes lower than the cutoff frequency of the image pickup optical system, leading to a situation where the resolution performance of the image pickup optical system is not utilized sufficiently. Another reason is that when the pixel size L is smaller than 1µ, the Nyquist frequency becomes too higher than the cutoff frequency of the image pickup optical system, leading to a situation where the resolution performance of the image pickup element is not utilized sufficiently.

In the microscope apparatus 100, sample S disposed on the stage 5 is illuminated by light that was emitted from the light source device 3 and has been incident via the optical fiber 4. Illuminated sample S is projected on the image pickup element 9 in an enlarged state by the objective 8 and the tube lens 1, and the enlarged image of sample S formed by the objective 8 and the tube lens 1 is picked up by the image pickup element 9. When the microscope apparatus 100 has an eyepiece, the enlarged image of sample S is observed by that eyepiece.

The microscope apparatus 100 having the above configuration makes it possible to conduct observation and image acquisition with wide field of view and high resolution.

Next, explanations will be given for the configuration and effects of the tube lens 1.

As described above, the tube lens 1 is a microscope tube lens that forms an enlarged image of an object (sample S) by being combined with the objective 8, and condenses the infinite light beam (also referred to as an infinite light flux) from the objective 8 into the imaging plane on which the image pickup element 9 is arranged. The tube lens 1 includes, in the order from the object side, a first lens group that has positive power and that includes a cemented lens, a second lens group having negative power and a third lens group that has positive power as a whole and that consists of a plurality of lenses, each having positive power.

The first lens group mainly has a function of converting a parallel light beam arriving from the objective into a convergent light beam so as to decrease the height of an off-axis ray by using the positive power, and a function of correcting the spherical aberration and the axial chromatic aberration by using the cemented lens included in the first lens group.

The second lens group uses the negative power so as to lower the convergence degree by refracting the convergent light beam from the first lens group in the diffusion direction, and thereby outputs a ray while increasing the height of the ray toward the third lens group.

The third lens group mainly has a function of using the plurality of positive lenses to achieve a balance between the axial aberration and the off-axis aberration by correcting the chromatic aberration of magnification and the distortion aberration that occurred in the first and second lens groups, and a function of using the positive power that the third lens group has as a whole to condense the ray onto the imaging plane. Note that the off-axis principal ray is the highest in the third lens group.

The tube lens 1 employs a configuration of a positive lens group, a negative lens group and a positive lens group in this order so that the second lens group has negative power, and thereby can provide good correction of the spherical aberration, the astigmatism, the comma aberration and the Petzval sum. Also, this configuration can maintain high telecentricity on the image side even when the distance is long between the position of the exit pupil of the objective and the tube lens 1. Accordingly, it is possible to provide good correction of the axial aberration and the off-axis aberration. Further, the field curvature and the astigmatism are also corrected, making it possible to form, on the imaging plane, an image that is homogeneous from the center to the peripheries and that is based on a wide field of view.

Further, because comma aberrations tend to occur more in the third lens group, in which the height of an off-axis ray is high, than in the first or second lens groups, it is very important in view of good correction of the comma aberration in the entire tube lens 1 to suppress the amount of generated comma aberrations in the third lens group. Regarding this point, by including a plurality of lenses having positive power in the third lens group, it is possible for the tube lens 1 to make relatively large a curvature radius of each of such lenses having positive power while realizing prescribed positive power in the third lens group as a whole. Thereby, it is possible to prevent the angle of an off-axis marginal ray incident on a lens surface and the refraction angle at the lens from becoming too large. As a result of this, because the amount of generated comma aberrations in the third lens group is suppressed sufficiently, it is possible to provide good correction of comma aberrations in the tube lens 1.

Hereinafter, a configuration desirable for the tube lens 1 will be explained.

It is desirable that the first lens group include a lens having the concave surface facing toward the image side (referred to as a first lens hereinafter). By employing a configuration in which the tube lens 1 includes the first lens in the first lens group, when the convergent light beam obtained through the conversion, conducted by the first lens group, from the parallel light beam is incident on the concave surface of the first lens facing toward the image side, the incident angle of the convergent light beam becomes smaller. Accordingly, the negative power of this concave surface has effects of suppressing the spherical aberration, the comma aberration and the astigmatism occurring in the first lens group. Also, the negative power of this concave surface also contributes to the reduction in the Petzval sum.

Further, it is desirable that the first lens included in the first lens group be a meniscus lens including a single lens or a cemented lens having the concave surface facing toward the image side, and it is more desirable that the first lens be arranged closest to the image in the first lens group. In such a case, the parallel light beam from the objective 8 is converted into a convergent light beam before being incident on the first lens in the first lens group, and is incident on the first lens.

When the first lens is a meniscus lens, the surface facing toward the object side is convex, making the angle of light incident on that surface smaller. Thereby it is possible to reduce the spherical aberration, the comma aberration and the astigmatism occurring on the convex surface of the first lens. Also, it is possible to distribute the positive power of the first lens group to lenses or a lens group, which is closer to the object than the first lens is (referred to as a first-a lens group hereinafter) and to the convex surface of the first lens. This makes it possible to moderate the curve of a ray on each surface in the first lens group. Thereby, it is possible to suppress the amount of the spherical aberrations occurring in the first lens group. Configurations including such a first lens are advantageous in preventing the deterioration of the peripheral performance and can contribute to better correction of comma aberrations in a tube lens having an entrance pupil with a large diameter and having a high field number such as the tube lens 1.

It is desirable that the second lens group include a lens having the concave surface facing toward the object side (referred to as a second lens hereinafter). By employing a configuration in which the tube lens 1 includes the second lens in the second lens group, when a convergent light beam output from the first lens group to be incident on the second lens group is incident on the concave surface of the second lens facing toward the object side, the incident angle of the convergent light beam becomes larger. Accordingly, the negative power of this concave surface has large effects on the convergent light beam, causing an aberration in the direction to cancel the spherical aberration, the comma aberration and the astigmatism caused in the first lens group.

Further, it is desirable that the second lens included in the second lens group be a meniscus lens including a single lens or a cemented lens having the concave surface facing toward the object side, and it is more desirable that the second lens be arranged closest to the object in the second lens group. As described above, the second lens group has a function of increasing the height of the off-axis principal ray toward the third lens group. When the surface of the second lens facing toward the image side is flat or concave, the height of the ray output from the second lens increases sharply. This leads to a too large angle of the off-axis principal ray incident on the third lens group, increasing the generation amount of the off-axis aberrations (comma aberrations and chromatic aberrations of magnification) in the third lens group. Therefore, it is desirable that the second lens be a meniscus lens having the concave surface facing toward the object side in order to suppress the occurrence of off-axis aberrations in the third lens group. It is also possible to configure the second lens group by using only meniscus lens. Configurations including such a second lens are advantageous in preventing the deterioration of the peripheral performance and can contribute to better correction of the comma aberration and the chromatic aberration of magnification in a tube lens having an entrance pupil with a large diameter and having a high field number such as the tube lens 1.

Accordingly, a configuration in which the first lens group includes the first lens and the second lens group includes the second lens is desirable in that it is possible to suppress the amounts of spherical aberrations, comma aberrations and astigmatism that have been caused in the light output from the second lens group via the first lens group and that it is possible to correct better the field curvature.

The first and second lenses have a function of correcting, by using the concave surfaces having negative power, chromatic aberrations by causing an axial chromatic aberration and a chromatic aberration of magnification in the direction opposite to the axial chromatic aberration and the chromatic aberration of magnification that have occurred in the first-a lens group having positive power. Accordingly, in order to cancel chromatic aberrations efficiently, it is desirable that the first lens and second lens include at least four lenses in total with at least one lens being a cemented lens. It is more desirable that both of the first and second lenses be cemented lenses. Configurations including such first and second lenses are advantageous in preventing the deterioration of the peripheral performance and can contribute to better correction of the chromatic aberration of magnification in a tube lens having an entrance pupil with a large diameter and having a high field number such as the tube lens 1.

Note that also in a case where a cemented lens is placed in other locations such as the third lens group etc., it is possible to achieve a balance of chromatic aberrations by reducing chromatic aberrations caused from positive power. In such a case, however, because the heights of the off-axis principal ray and the marginal ray are high, it is difficult to conduct a fine adjustment of chromatic aberrations. This makes it necessary to prepare many lenses for correction of aberrations, increasing the number of lenses constituting the tube lens 1.

It is desirable that the third lens group include a meniscus lens with positive power having the concave surface facing toward the object side. This makes it possible to suppress the angle at which the off-axis principal ray is incident on that meniscus lens with its height being increased while travelling from the second lens group. Thereby, it is possible to provide good correction of comma aberrations while correcting astigmatism.

Hereinafter, conditions satisfied by the tube lens 1 will be explained.

The tube lens 1 is configured to satisfy following condition expression (4).

$$0.3 < D2/FL < 1.3 \quad (4)$$

In the above expression, FL is the focal length of the tube lens 1, and D2 is the distance between the lens surface closest to the object in tube lens 1 (the lens surface closest to the objective 8) and the position of the entrance pupil of the tube lens 1 (the position of the exit pupil of the objective 8). Note that a tube lens of a microscope is usually arranged in such a manner that the position of the entrance pupil of the tube lens and the position of the exit pupil of the objective coincide. Accordingly, explanations below is based on an assumption that the position of the entrance pupil of a tube lens and the position of the exit pupil of an objective refer to substantially the same position.

Condition expression (4) represents a condition for good correction of the comma aberration and the astigmatism of an off-axis ray and the axial spherical aberration in a case when the position of the entrance pupil of the tube lens 1 (the position of the exit pupil of the objective 8) is on the object side of the tube lens 1. Also, by satisfying condition expression (4), the tube lens 1 can realize high telecentricity. This makes it possible to cause a ray guided from the tube lens 1 to be incident on the image pickup element such as a CCD image sensor etc. in a state advantageous for the image pickup element (i.e., state in which the ray is almost parallel to the optical axis). By satisfying at least condition expression (4), the tube lens 1 can realize excellent optical performance compatible with an objective with a wide field of view.

When D2/FL has exceeded the upper limit value in condition expression (4), the position of the entrance pupil of the tube lens 1 (the position of the exit pupil of the objective) becomes too distant from the first lens group. This extremely increases the height of an off-axis ray when it is incident on the first lens group, increasing the comma aberration and the astigmatism of the off-axis ray and the spherical aberration. This also decreases the telecentricity on image side. Further, because the outer diameter of the tube lens 1 also becomes larger, decreasing the productivity. Meanwhile, when D2/FL has fallen below the lower limit value, the position of the entrance pupil of the tube lens 1 (position of the exit pupil of the objective) becomes too close to the first lens group. This prevents the height of the off-axis ray from becoming high sufficiently when the ray is incident on the first lens group. This makes it difficult to provide good correction of the off-axis comma aberration and the astigmatism. This also decreases the telecentricity on the image side.

Hereinbelow, explanations will be given for conditions that it is desirable that the tube lens 1 satisfy.

It is desirable that the tube lens 1 satisfy the following condition expressions.

$$0.3 < FLG1/FL < 3 \quad (5)$$

$$-4 < FLG2/FL < -0.05 \quad (6)$$

$$0.3 < D1/D0 < 0.8 \quad (7)$$

In the above expressions, FLG1 is the focal length of the first lens group and FLG2 is the focal length of the second lens group. Also, D0 is the distance between the lens surface closest to the object in the tube lens 1 and the imaging plane on which the enlarged image is formed, and D1 is the distance between the lens surface closest to the object in the tube lens 1 and the lens surface closest to the image in the tube lens 1.

Condition expression (5) defines the relationship between the focal length of the first lens group and the entire focal length. Condition expression (6) defines the relationship between the focal length of the second lens group and the entire focal length. By satisfying condition expressions (5) and (6), the power distribution between the first lens group and the second lens group of the tube lens 1 becomes appropriate. Thereby, the tube lens 1 provides better correction of the spherical aberration and the comma aberration in the entirety of the tube lens 1 and can also provide better correction of field curvature by reducing the Petzval Sum by using the negative power of the second lens group. Particularly, better correction of the field curvature and the comma aberration is important in preventing the deterioration of the peripheral performance in a tube lens having an entrance pupil with a large diameter and having a high field number such as the tube lens 1. Therefore, it is desirable that condition expressions (5) and (6) be satisfied.

When FLG1/FL has exceeded the upper limit value in condition expression (5), the power of the first lens group becomes too low relative to the power of the entire tube lens 1. Accordingly, the power of other lens groups including the second lens group similarly becomes too low relative to the power of the entire tube lens. This increases the Petzval Sum, worsening the field curvature and the comma aberration. Meanwhile, when FLG1/FL has fallen below the lower limit value, the power of the first lens group becomes too high relative to the power of the entire tube lens 1. Thereby, the power of other lens groups similarly becomes high relative to the power of the entire tube lens, worsening the spherical aberration and the comma aberration. Also, because the power of each lens group is high and the eccentricity sensitivity is high, slight lens eccentricity worsens various types of aberration.

When FLG2/FL has exceeded the upper limit value in condition expression (6), the power of the second lens group becomes too high relative to the power of the entire tube lens 1. Accordingly, the power of other lens groups similarly becomes too high relative to the power of the entire tube lens, worsening the spherical aberration and the comma aberration. Also, because the power of each lens group is high and the eccentricity sensitivity is high, slight lens eccentricity worsens various types of aberration. Meanwhile, when FLG2/FL has fallen below the lower limit value, the power of the second lens group becomes too low relative to the power of the entire tube lens 1. This increases the Petzval Sum, worsening the field curvature and the comma aberration.

Condition expression (7) defines the relationship between the distance from the lens surface closest to the object in the tube lens 1 (referred to as a first surface hereinafter) to the imaging plane, which is the imaging position, and the entire length of the tube lens 1, which corresponds to the distance from the first surface to the lens surface closest to the image in the tube lens 1 (referred to as a last surface hereinafter). The lens surface closest to the object in the tube lens 1 is the lens surface closest to the objective 8 in the tube lens 1. The lens surface closest to the image in the tube lens 1 is the lens surface closest to the imaging plane. By satisfying condition expression (7), the tube lens 1 can provide good correction of the spherical aberration, the comma aberration and the astigmatism on the imaging plane and realize high telecentricity on the image side without extremely elongating the entire length of itself. Particularly, better correction of the field curvature and the comma aberration is important in preventing the deterioration of the peripheral performance in a tube lens having an entrance pupil with a large diameter and having a high field number such as the tube lens 1. Therefore, it is desirable that condition expression (7) be satisfied.

When D1/D0 has exceeded the upper limit value in condition expression (7), the distance from the third lens group to the imaging position becomes too short. This makes it difficult to arrange an image pickup element, an optical path splitting element, a parfocality adjustment mechanism, etc., which are to be arranged on the image side of the tube lens 1. When D1/D0 has fallen below the lower limit value, the distance from the first lens group to the third lens group becomes too short, making it difficult to correct spherical aberrations and comma aberrations. Also, even when spherical aberrations and comma aberrations have been corrected, because the power of each lens group becomes too high, the eccentricity sensitivity of lens groups increases, leading to a situation where slight lens eccentricity worsens various types of aberrations.

It is desirable that the tube lens 1 satisfy the following condition expressions when the first lens group includes, at the position closest to the image, the first lens that is a meniscus lens having the concave surface facing toward the image side and the second lens group includes, at the position closest to the object, the second lens that is a meniscus lens having the concave surface facing toward the object side.

$$30 < \nu 1 - \nu s \tag{8}$$

$$30 < \nu 11 - \nu s 1 \tag{9}$$

$$25 < \nu 12 - \nu s 2 \tag{10}$$

Note, when at least one of the first and second lenses is a cemented lens including a lens with positive power and a lens with negative power (i.e., an achromatizing lens), ν1 is the highest Abbe number among Abbe numbers of lenses with positive power included in that cemented lens. Also, νs is the smallest Abbe number among Abbe numbers of lenses with negative power included in that cemented lens.

Also, when each of the first lens and the second lens is a cemented lens including a lens with positive power and a lens with negative power (i.e., an achromatizing lens), ν11 is the highest Abbe number among Abbe numbers of lenses with positive power included in a first cemented lens, which is one of the first and second lenses. νs1 is the smallest Abbe number among Abbe numbers of lenses with negative power included in the first cemented lens. ν12 is the highest Abbe number among Abbe numbers of lenses with positive power included in a second cemented lens, which is the other of the first and second lenses. νs2 is the smallest Abbe number among Abbe numbers of lenses with negative power included in the second cemented lenses.

Condition expressions (8) through (10) define a difference of Abbe numbers of glass materials of achromatizing lenses (first lens and/or second lens). By satisfying condition expression (8), it is possible to cancel the chromatic aberration of magnification and the axial chromatic aberration that have occurred in the first lens group so as to provide good correction of the chromatic aberration as a whole. When ν1−νs has fallen below the lower limit value in condition expression (8), the amount of correction of the chromatic aberration of magnification and the axial chromatic aberration in an achromatizing lens becomes smaller, making it difficult to provide good correction of the chromatic aberration on the imaging plane. Note that achromatizing lenses are lenses that correct chromatic aberrations by causing chromatic aberrations in the direction opposite to the direction of chromatic aberrations that have occurred previously (i.e., on the object side).

When the imaging system is to be configured by using the objective 8 that is of an infinity-corrected type and the tube lens 1, the objective 8 with a high field number tends to have chromatic aberrations of magnification caused in a fixed direction, sometimes making it difficult to correct aberrations. In such a case, it is desirable to use the tube lens 1 for causing chromatic aberrations of magnification in the direction opposite to the objective 8 in order to cancel the chromatic aberration of magnification with the entire imaging system. By satisfying condition expressions (9) and (10), it is possible to excessively correct chromatic aberrations occurring in the tube lens 1 by using a plurality of achromatizing lenses. This also makes it possible to provide good correction of chromatic aberrations of magnification, which the objective 8 failed to correct completely, in addition to the chromatic aberration of magnification and the axial chromatic aberration having occurred in the first lens group. When ν11−νs1 has fallen below the lower limit value in condition expression (9) or when ν12−νs2 has fallen below the lower limit value in condition expression (10), the amount of correction of the chromatic aberration of magnification and the axial chromatic aberration becomes smaller. This makes it difficult to correct completely the chromatic aberration of magnification having occurred in the objective 8.

In other words, in order to attain high performance of correcting chromatic aberration by using a tube lens alone, it is desirable that the tube lens 1 satisfy condition expression (8), and in order to also correct chromatic aberration that has not been corrected by the objective 8 completely, it is desirable that condition expressions (9) and (10) be satisfied.

When the first lens group includes the first lens having the concave surface facing toward the image side and the second lens group includes the second lens having the concave surface facing toward the object side, it is desirable that the tube lens 1 satisfy the following condition expressions.

$$0 < |RG2/RG1| < 3 \tag{11}$$

$$1.5 < NdG2 \tag{12}$$

$$70 < \nu dG1 \tag{13}$$

In the above expressions, RG1 is a curvature radius of the concave surface of the first lens facing toward the image side and RG2 is a curvature radius of the concave surface of the second lens facing toward the object side. NdG2 is a refractive index with respect to d line of the second lens or, in a case when the second lens is a cemented lens, a refractive index with respect to d line of the lens closest to the object among lenses constituting the second lens. vdG1 is the highest Abbe number among Abbe numbers of lenses with positive power included in the first lens group. Note that when the first lens group includes a plurality of concave surfaces facing toward the image side, it is desirable that RG1 be the curvature radius of the concave surface closest to the image.

Condition expression (11) defines the ratio of the curvature radius of the concave surface of the second lens facing the object to the curvature radius of the concave surface of the first lens facing toward the image side. By satisfying condition expression (11), these lenses effectively contribute to the suppression of aberration, making it possible to suppress the amount of various types of aberrations caused in light output from the second lens group via the first lens group.

When |RG2/RG1| has exceeded the upper limit value in condition expression (11), the curvature radius of the concave surface of the first lens facing toward the image side becomes too small or the curvature radius of the concave surface of the second lens facing toward the object side becomes too large. When the curvature radius of the concave surface facing toward the image side has become too small, the negative power generated on the concave surface of the first lens become too high, worsening the spherical aberration, the comma aberration, and the astigmatism. Also, when the curvature radius of the concave surface of the second lens has become too large, the negative power of the second lens group becomes too low, worsening the field curvature and the comma aberration.

Condition expression (12) defines a refractive index with respect to d line of the second lens. By satisfying condition expression (12), it is possible to provide good correction of the field curvature by suppressing the Petzval Sum. This makes it possible to reduce the generation amount of the spherical aberration, the astigmatism and the comma aberration in each lens group. When NdG2 has fallen below the lower limit value in condition expression (12), in order to generate the required power in the second lens, it is necessary to considerably reduce the curvature radius of the concave surface of the second lens facing toward the object so that. This makes it difficult to provide good correction of the spherical aberration, the comma aberration and the field curvature as the whole of the tube lens 1.

Condition expression (13) defines the highest Abbe number among Abbe numbers of lenses with positive power included in the first lens group. By satisfying condition expression (13), it is possible to provide good correction of the spherical aberration and the axial chromatic aberration in the first lens group, in which the height of the axial ray is the highest. When vdG1 has fallen below the lower limit value in condition expression (13), it is difficult to provide good correction of the spherical aberration and the axial chromatic aberration.

When the third lens group includes the third lens with the positive power at the position closest to the object and the fourth lens with the positive power at the position closest to the image, it is desirable that the tube lens 1 satisfy the following condition expression, where FLG3a is the focal length of the third lens, and FLG3b is the focal length of the fourth lens. Note that the third and fourth lenses may be single lenses or cemented lenses.

$$0.2 < FLG3b/FLG3a < 5 \quad (14)$$

Condition expression (14) defines the power distribution in the third lens group. By satisfying condition expression (14), the positive power of the third lens group is distributed appropriately, making it possible to provide good correction of the spherical aberration, the comma aberration and the field curvature. When FLG3b/FLG3a has fallen below the lower limit value in condition expression (14), the power of the fourth lens becomes too high relative to the power of the third lens. This cases large comma aberrations and field curvature in the fourth lens, in which the height of the off-axis principal ray is high. When FLG3b/FLG3a has exceeded the upper limit value in condition expression (14), the power of the third lens becomes too high relative to the power of the fourth lens. This causes a large spherical aberration in the third lens group, increasing the amount of aberrations occurring in the tube lens 1 as a whole. Configurations satisfying condition expression (14) are advantageous in preventing the deterioration of the peripheral performance and can contribute to better correction of comma aberrations and chromatic aberrations of magnification in a tube lens having an entrance pupil with a large diameter and having a high field number such as the tube lens 1.

It is desirable that the tube lens 1 satisfy the following condition expressions.

$$1.7 < NdG3 \quad (15)$$

$$vdG3 < 45 \quad (16)$$

In the above expression, NdG3 is the highest refractive index among the refractive indexes of lenses included in the third lens group and vdG3 is the lowest Abbe number among Abbe numbers of lenses included in the third lens group.

Condition expression (15) defines the refractive index with respect to d line of a positive lens included in the third lens group. By satisfying condition expression (15), it is possible to reduce, by using a lens with the positive power of the third lens group, the distortion aberration caused by the negative power of the second lens group while providing good correction of the off-axis comma aberration. When NdG3 has fallen below the lower limit value, the curvature radius of the lens surface of a positive lens included in the third lens group becomes smaller, worsening the comma aberration or the distortion aberration.

Condition expression (16) defines the Abbe number of a positive lens included in the third lens group. By satisfying condition expression (16), it is possible to provide good correction of the off-axis chromatic aberration of magnification in the third lens group, in which the off-axis principal ray become the highest. When vdG3 has exceeded the upper limit value, it is difficult to provide good correction of the chromatic aberration of magnification.

It is desirable that the tube lens 1 satisfy the following condition expressions.

$$0.3 < Ha/Hi < 1 \quad (17)$$

$$-0.04 < (Ea - Ec)/FL < 0.03 \quad (18)$$

In the above expressions, Ha is the height of the off-axis principal ray when it is incident on the lens surface closest to the object in the tube lens 1, and Hi is the height of that off-axis principal ray when it is incident on the imaging plane. Ea is the maximum effective diameter of a lens included in the first lens group. Ec is the maximum effective diameter of a lens included in the third lens group.

Condition expression (17) defines the height of the off-axis principal ray. By satisfying the condition expression (17), the height of the off-axis principal ray is maintained within an appropriate range, making it possible to provide good correction of the comma aberration of the tube lens 1. When Ha/Hi has fallen below the lower limit value, the curve of the lower marginal ray of the off-axis light beam becomes too moderate, leading to insufficient correction of the comma aberration in the third lens group. Meanwhile, when Ha/Hi has exceeded the upper limit value, the curve of the upper marginal ray of the off-axis light beam becomes too sharp, leading to a situation where the comma aberration becomes abruptly worsens on the off-axis. Configurations satisfying condition expression (17) are advantageous in preventing the deterioration of the peripheral performance and can contribute to better correction of comma aberrations and chromatic aberrations of magnification in a tube lens having an entrance pupil with a large diameter and having a high field number such as the tube lens 1.

Condition expression (18) defines the effective diameter of a lens. By satisfying condition expression (18), it is possible to reduce the deterioration of the exit NA of an off-axis light beam with respect to the exit NA of an on-axis light beam. When (Ea−Ec)/FL has fallen below the lower limit value, the diameter of the first lens group become smaller, worsening the deterioration of NA in case of an off-axis light beam. This causes differences in the brightness between a portion with a high image height and a portion with a low image height, resulting in unevenness in light amount. Meanwhile, when (Ea−Ec)/FL has exceeded the upper limit value, the diameter of the first lens group becomes too large, leading to a wider area through which the effective light beam does not pass. This also deteriorates the lens processing accuracy and increases the degree of difficulty of processing frames.

It is desirable that the tube lens 1 be configured to satisfy the following condition expression.

$$0.04 < NA \tag{1}$$

$$1700 \leq FN/\epsilon \tag{2}$$

$$-2 \leq FN/EXP1 \leq 2 \tag{3}$$

In the above expressions, NA is the numerical aperture on the image side of the tube lens 1, FN is the field number of the tube lens 1, $\epsilon$ is the airy disk diameter (i.e., $\epsilon = 1.22 \times \lambda / NA$) with respect to d line (588 nm) of the tube lens 1, and EXP1 is the distance from the imaging plane to the position of the exit pupil of the tube lens 1. EXP1 is expressed by a negative value when the position of the exit pupil is on the tube lens 1 side with respect to the imaging plane, and is expressed by a positive value when the position of the exit pupil is on the side away from the tube lens 1 with respect to the imaging plane (that is, the side opposite to the imaging lens with respect to the imaging plane). Note that the position of the exit pupil of the tube lens 1 is the position at which the principle ray passing through the center of the pupil of the objective 8 crosses with the optical axis. Also, the field number corresponds to twice the maximum image height. Note that when an optical image formed by the optical system of the microscope is picked up by using the image pickup element 9 so as to conduct digital observation, it is desirable that the diagonal length of the image pickup element 9 be roughly identical to the field number of the tube lens 1.

Condition expression (1) represents a condition for attaining sufficient resolution. Also, by NA not falling below the lower limit value of condition expression (1), it is possible to reduce sufficiently the diameter of the airy disk, making it possible to attain sufficient resolution. Also, a high NA leads to a large diameter of the ray passing through the tube lens 1, making it necessary to increase the diameter of the tube lens 1. By NA not exceeding the upper limit value of condition expression (1), it is possible to suppress the diameter of the tube lens 1 to a level that permits production.

It is also possible to configure the tube lens 1 to satisfy the following condition expression.

$$0.04 < NA \leq 0.08 \tag{1-1}$$

It is also possible to configure the tube lens 1 to satisfy the following condition expression.

$$0.045 \leq NA \leq 0.08 \tag{1-2}$$

Condition expression (2) represents a condition for attaining sufficient resolution and a wide field of view. By FN/$\epsilon$ not falling below the lower limit value of condition expression (2), it is possible to conduct observation of a sample and to acquire images with a wide field of view and high resolution.

It is also possible to configure the tube lens 1 to satisfy the following condition expression.

$$1700 \leq FN/\epsilon \leq 10000 \tag{2-1}$$

Condition expression (3) represents a condition for maintaining telecentricity. By FN/EXP1 being within the range of condition expression (3), the telecentricity of tube lens 1 is maintained. Thereby, it is possible to reduce influence of shading based on the angle characteristic of the image pickup element 9.

Note that an arbitrary combination from condition expression (1) through condition expression (18) may be applied to the tube lens. It is also possible to use only one of the upper limit value and the lower limit value of each of the expressions in order to limit the variables.

Hereinafter, specific explanations will be given for an example of the above tube lens 1.

Example 1

Figure 2:
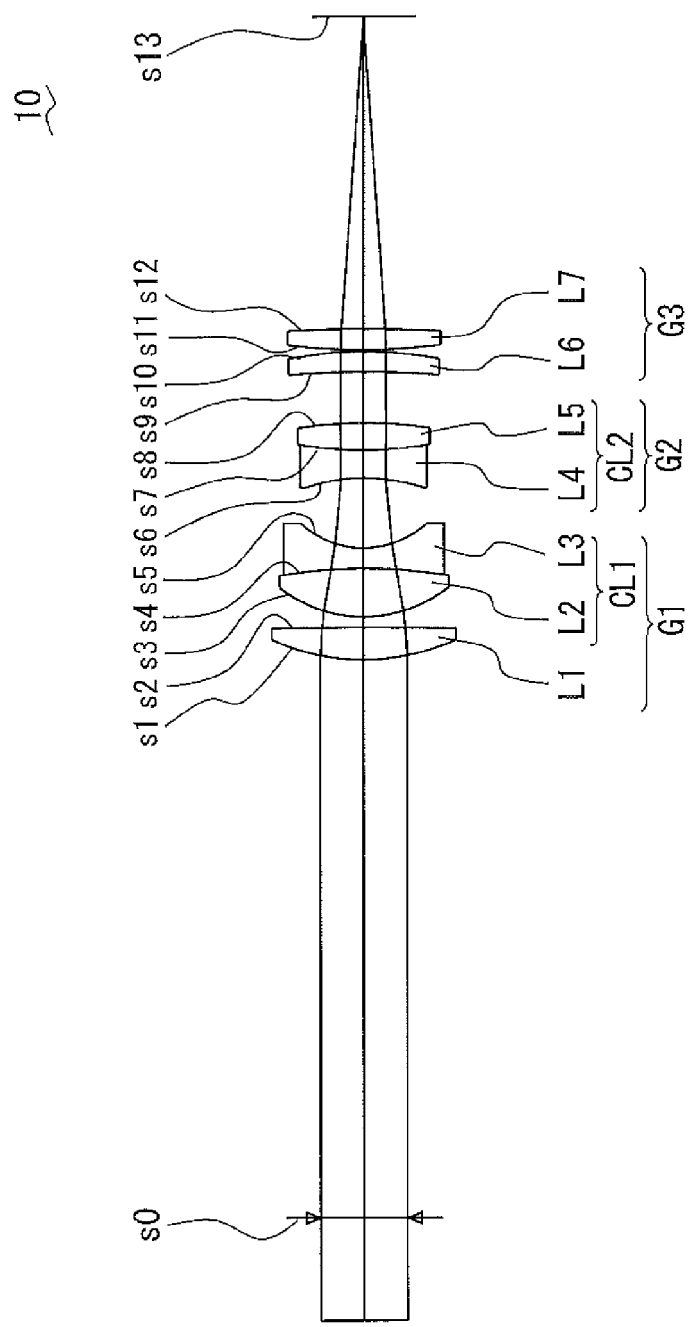
FIG. 2 is a sectional view of a tube lens according to example 1 of the present invention.

FIG. 2 is a sectional view of a tube lens 10 according to the present example. The tube lens 10 exemplified in FIG. 2 is a microscope tube lens that forms an enlarged image of an object by being combined with an infinity-corrected objective. The tube lens 10 includes, in the order from the object side, a first lens group G1, having positive power, that includes a cemented lens CL1, a second lens group G2 having negative power and a third lens group G3, having positive power as a whole, that consists of a plurality of lenses (L6 and L7) each having positive power.

The first lens group G1 includes, in the order from the object side, a biconvex lens L1 and a cemented lens CL1 (first lens) including a biconvex lens L2 and a biconcave lens L3. The second lens group G2 includes, in the order from the object side, a cemented lens CL2 (second lens) including a biconcave lens L4 and a biconvex lens L5. The third lens group G3 includes, from the object side, a meniscus lens L6 (third lens) with positive power having the concave surface facing toward the object side and a biconvex lens L7 (fourth lens). The first lens and the second lens respectively employ meniscus shapes.

In other words, the tube lens 10 including the three lens groups respectively having positive power, negative power and positive power can identify the boundary between the first lens group G1 and the second lens group G2 by utilizing the feature that the lens arranged closest to the object in the second lens group G2 is the lens having the concave surface facing toward the object side. Also, it is possible to identify the boundary between the second lens group G2 and the third lens group G3 by utilizing the feature that the third lens group G3 consists of a plurality of lenses having positive power.

Data of the tube lens 10 is as below. Note that the reference wavelength is d line (587.56 nm). NA is the numerical aperture on the image side. The other symbols represent the same factors as in expressions (1) through (18) above.

NA=0.07, FN=30 mm,
$\epsilon$=0.010248 mm, EXP1=1999.9952 mm
FL=180 mm, FLG1=142.1901 mm, FLG2=−81.4882 mm
D0=186.88 mm, D1=90.8598 mm, D2=162.2 mm
FLG3a=313.55 mm, FLG3b=151.876 mm
Ea=26.595 mm, Ec=22.093 mm Lens data of the tube lens 10 is as below. Note that inf in the lens data represents infinity ($\infty$).

The tube lens 10

| s | r | d | nd | vd |
|---|---|---|---|---|
| s0 | inf | 162.2 | | |
| s1 | 63.8523 | 9.3326 | 1.497 | 81.54 |
| s2 | −1485.8995 | 3.1666 | | |
| s3 | 39.1423 | 13.9864 | 1.497 | 81.54 |
| s4 | −145.3496 | 6 | 1.51633 | 64.14 |
| s5 | 26.8639 | 20.2953 | | |
| s6 | −53.5928 | 8.0905 | 1.72047 | 34.71 |
| s7 | 110.3106 | 7.877 | 1.43875 | 94.93 |
| s8 | −130 | 14.8023 | | |
| s9 | −288.1082 | 6 | 1.59522 | 67.74 |
| s10 | −114.1428 | 0.4703 | | |
| s11 | 176.2945 | 6 | 1.85026 | 32.27 |
| s12 | −475.1754 | 90.8598442 | | |
| s13 | inf | | | |

In the above data, s represents the surface number, r represents the curvature radius (mm), d represents the surface interval (mm), nd represents the refractive index with respect to d line and vd represents the Abbe number. These symbols represent the same factors in the following examples. Note that the surface represented by surface number s0 is the surface of the position of the entrance pupil of the tube lens 10 (position of the exit pupil of the objective), and the surface represented by surface number s13 is the imaging plane. Also, surface interval d0 for example represents the distance from the surface represented by surface number s0 to the surface represented by surface number s1.

As represented by expressions (1A) through (18A) below, the tube lens 10 satisfies condition expressions (1) through (18), excluding condition expression (11). Note that expressions (1A) through (18A) correspond to condition expressions (1) through (18), respectively. Also, expression (17A) is calculation that uses an example of the principal ray incident on the position with the field number of 30.

NA=0.07 (1A)

FN/$\epsilon$=2927 (2A)

FN/EXP1=0.015 (3A)

D2/FL=0.901 (4A)

FLG1/FL=0.790 (5A)

FLG2/FL=−0.453 (6A)

D1/D0=0.486 (7A)

$\nu 1 - \nu s$=60.200 (8A)

$\nu 11 - \nu s1$=60.200 (9A)

$\nu 12 - \nu s2$=17.400 (10A)

|RG2/RG1|=1.999 (11A)

NdG2=1.720 (12A)

$\nu$dG1=81.540 (13A)

FLG3b/FLG3a=0.484 (14A)

NdG3=1.850 (15A)

$\nu$dG3=32.270 (16A)

Ha/Hi=0.908 (17A)

(Ea−Ec)/FL=0.025 (18A)

Figure 3:
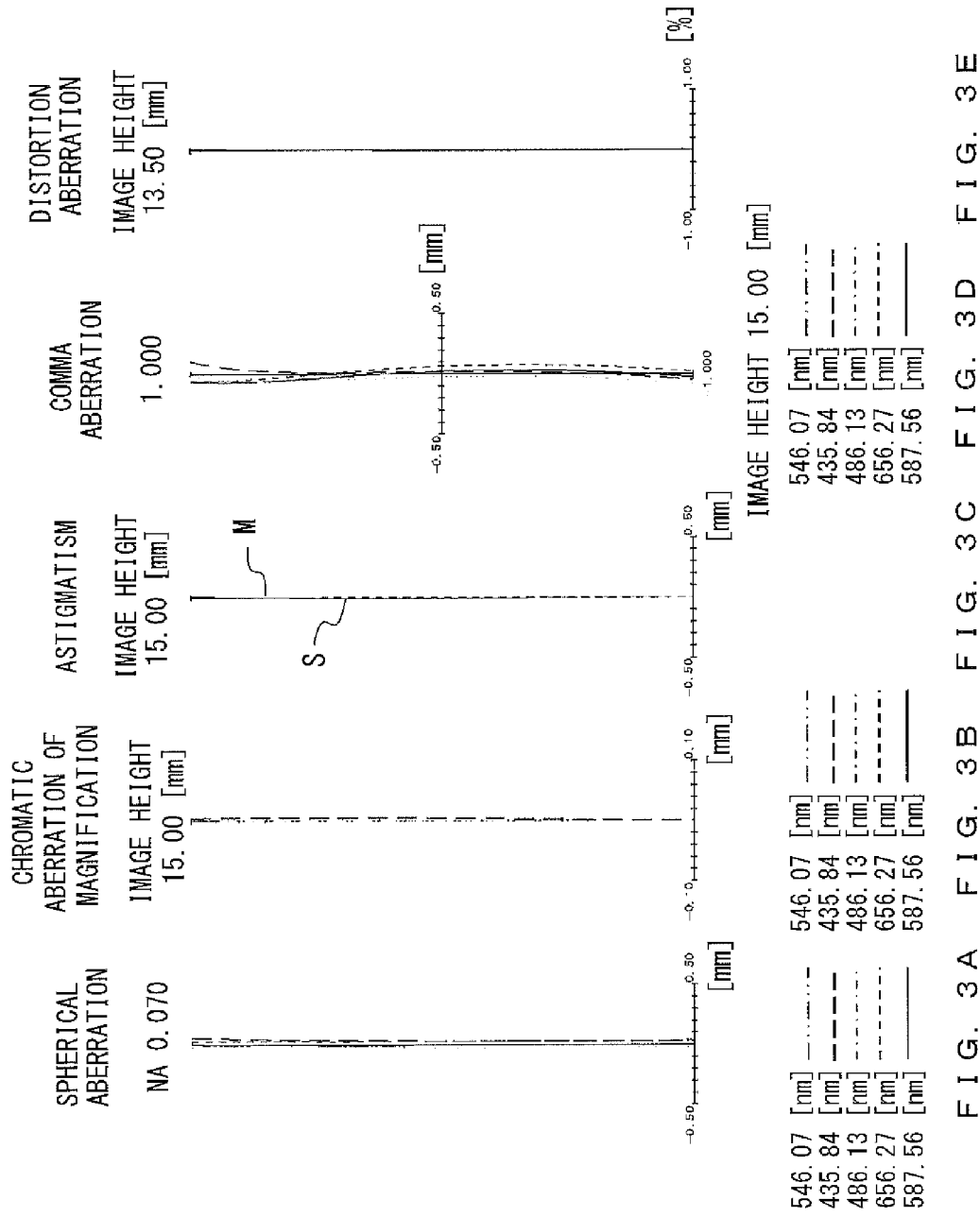
FIG. 3A through FIG. 3E are aberration diagrams of the tube lens exemplified in FIG. 2, and respectively show a spherical aberration, a chromatic aberration of magnification, astigmatism, a comma aberration and a distortion aberration.

FIG. 3A through FIG. 3E are aberration diagrams of the tube lens 10 exemplified in FIG. 2, and show aberrations on the imaging plane in a case when the parallel light beam is incident from the object side. FIG. 3A is a spherical aberration diagram, FIG. 3B is a diagram of a chromatic aberration of magnification, FIG. 3C is an astigmatism diagram, FIG. 3D is a comma aberration diagram, and FIG. 3E is a distortion aberration diagram. Note that "M" in the figures represents Meridional component, and "S" represents Sagittal component.

Example 2

Figure 4:
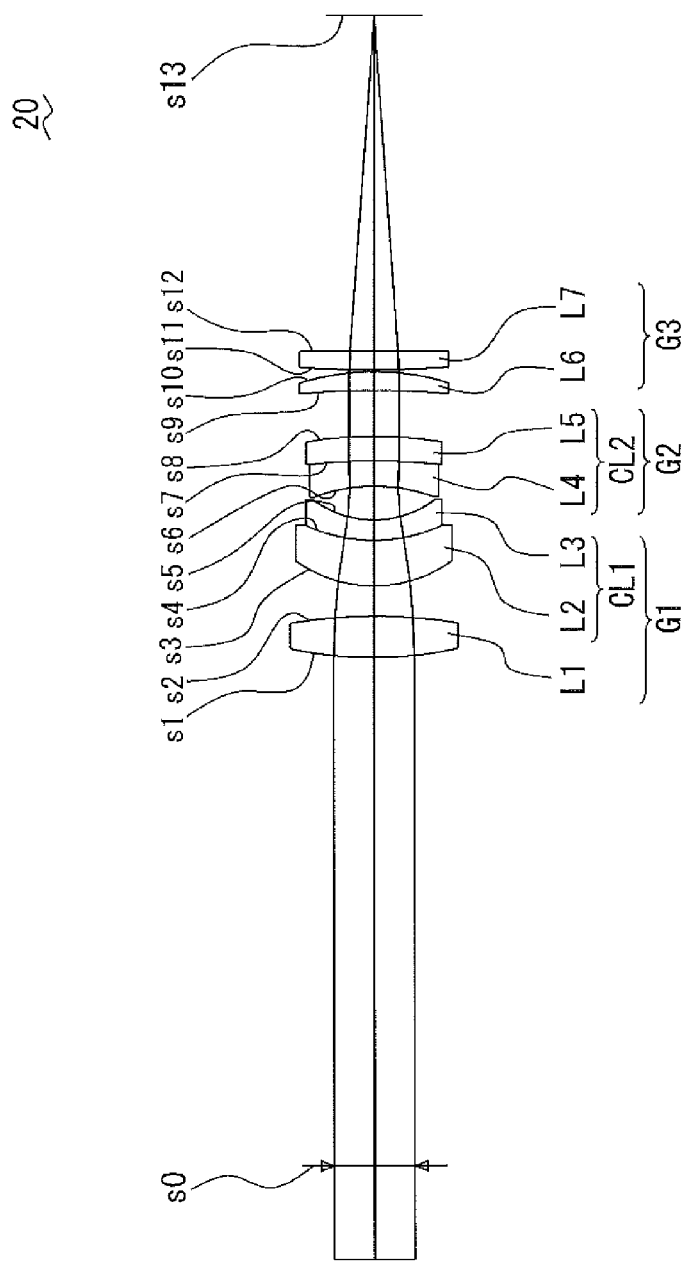
FIG. 4 is a sectional view of a tube lens according to example 2 of the present invention.
Figure 5:
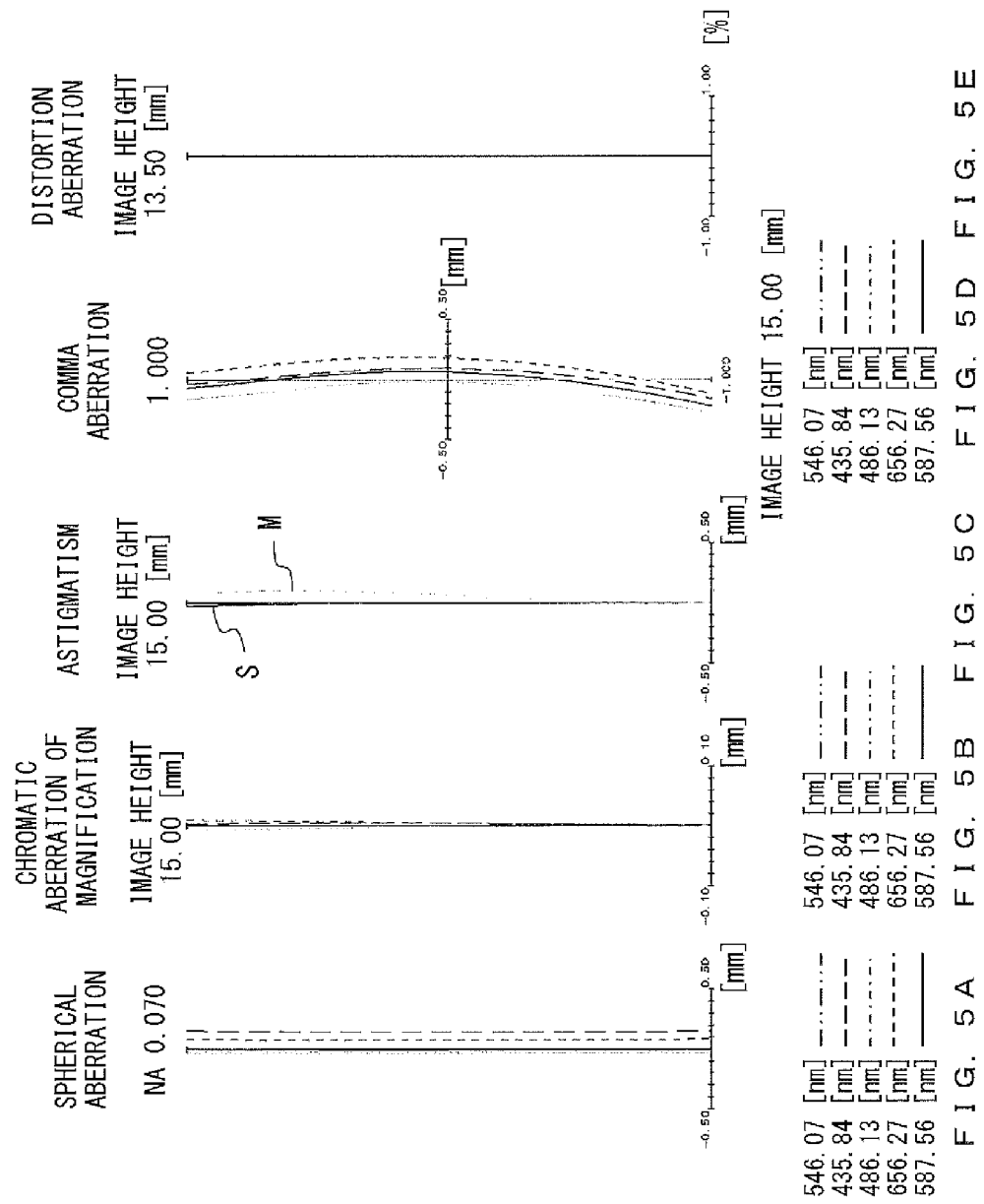
FIG. 5A through FIG. 5E are aberration diagrams of the tube lens exemplified in FIG. 4, and respectively show a spherical aberration, a chromatic aberration of magnification, astigmatism, a comma aberration and a distortion aberration.

FIG. 4 is a sectional view of a tube lens 20 according to the present example. The tube lens 20 exemplified in FIG. 4 is a microscope tube lens that forms an enlarged image of an object by being combined with an infinity-corrected objective. The tube lens 20 includes, in the order from the object side, a first lens group G1, having positive power, that includes a cemented lens CL1, a second lens group G2 having negative power and a third lens group G3, having positive power as a whole, that consists of a plurality of lenses (L6 and L7) each having positive power. Note that the boundaries between the first lens group G1, the second lens group G2 and the third lens group G3 are identified in a manner similar to that in example 1.

The first lens group G1 includes, in the order from the object side, a biconvex lens L1 and a cemented lens CL1 (first lens) including a meniscus lens L2 with positive power having the convex surface facing toward the object side and a meniscus lens L3 with negative power having the convex surface facing toward the object side. The second lens group G2 includes, in the order from the object side, a cemented lens CL2 (second lens) including a meniscus lens L4 with negative power having the concave surface facing toward the object side and a meniscus lens L5 with positive power having the concave surface facing toward the object side. The third lens group G3 includes, from the object side, a meniscus lens L6 (third lens) with positive power having the concave surface facing toward the object side and a biconvex lens L7 (fourth lens). The first lens and the second lens respectively employ meniscus shapes.

Data of the tube lens 20 is as below. Note that the reference wavelength is d line (587.56 nm).
NA=0.07, FN=30 mm,
ε=0.010248 mm, EXP1=1999.4602 mm
FL=180 mm, FLG1=160.3233 mm, FLG2=−11.2048 mm
D0=204.9437 mm, D1=107.891 mm, D2=162.2 mm
FLG3a=187.5652 mm, FLG3b=352.7182 mm
Ea=26.357 mm, Ec=23.38 mm Lens data of the tube lens 20 is as below. Note that the surface represented by surface number s0 is the surface of the position of the entrance pupil of the tube lens 20 (position of the exit pupil of the objective), and the surface represented by surface number s13 is the imaging plane.

| Tube lens 20 | | | | |
|---|---|---|---|---|
| s | r | d | nd | vd |
| s0 | inf | 162.2 | | |
| s1 | 120.7472 | 13.1775 | 1.43875 | 94.93 |
| s2 | −163.0581 | 9.7301 | | |
| s3 | 41.4285 | 14.5537 | 1.497 | 81.54 |
| s4 | 50 | 6.4656 | 1.51742 | 52.43 |
| s5 | 30.8345 | 10.7507 | | |
| s6 | −53.095 | 8.117 | 1.8 | 29.84 |
| s7 | −187.8877 | 7.8669 | 1.43875 | 94.93 |
| s8 | −124.275 | 14.613 | | |
| s9 | −252.1032 | 5.947 | 1.59522 | 67.74 |
| s10 | −78.0578 | 0.6331 | | |
| s11 | 351.1311 | 6 | 1.85026 | 32.27 |
| s12 | −2039.4189 | 107.0890528 | | |
| s13 | inf | | | |

As represented by expressions (1B) through (18B) below, the tube lens 20 satisfies condition expressions (1) through (18). Note that expressions (1B) through (18B) correspond to condition expressions (1) through (18), respectively. Also, expression (17B) is calculation that uses an example of the principal ray incident on the position with the field number of 30.

$$NA=0.07 \quad (1B)$$

$$FN/\epsilon=2927 \quad (2B)$$

$$FN/EXP1=0.015 \quad (3B)$$

$$D2/FL=0.901 \quad (4B)$$

$$FLG1/FL=0.891 \quad (5B)$$

$$FLG2/FL=-0.062 \quad (6B)$$

$$D1/D0=0.526 \quad (7B)$$

$$\nu 1-\nu s=65.090 \quad (8B)$$

$$\nu 11-\nu s1=65.090 \quad (9B)$$

$$\nu 12-\nu s2=29.110 \quad (10B)$$

$$|RG2/RG1|=1.722 \quad (11B)$$

$$NdG2=1.800 \quad (12B)$$

$$\nu dG1=94.930 \quad (13B)$$

$$FLG3b/FLG3a=1.881 \quad (14B)$$

$$NdG3=1.850 \quad (15B)$$

$$\nu dG3=32.270 \quad (16B)$$

$$Ha/Hi=0.905 \quad (17B)$$

$$(Ea-Ec)/FL=0.017 \quad (18B)$$

FIG. 5A through FIG. 5E are aberration diagrams of the tube lens 20 exemplified in FIG. 4, and show aberrations on the imaging plane in a case when the parallel light beam is incident from the object side. The types of these aberration diagrams are similar to those in example 1.

Example 3

Figure 6:
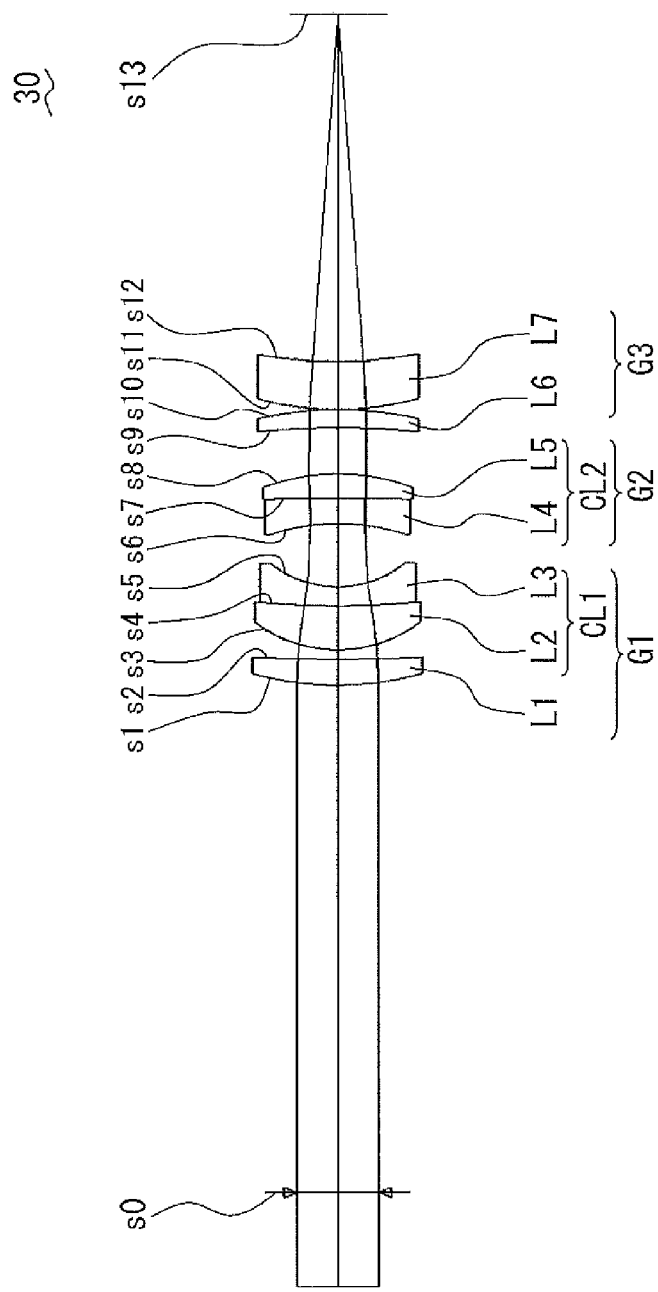
FIG. 6 is a sectional view of a tube lens according to example 3 of the present invention.
Figure 7:
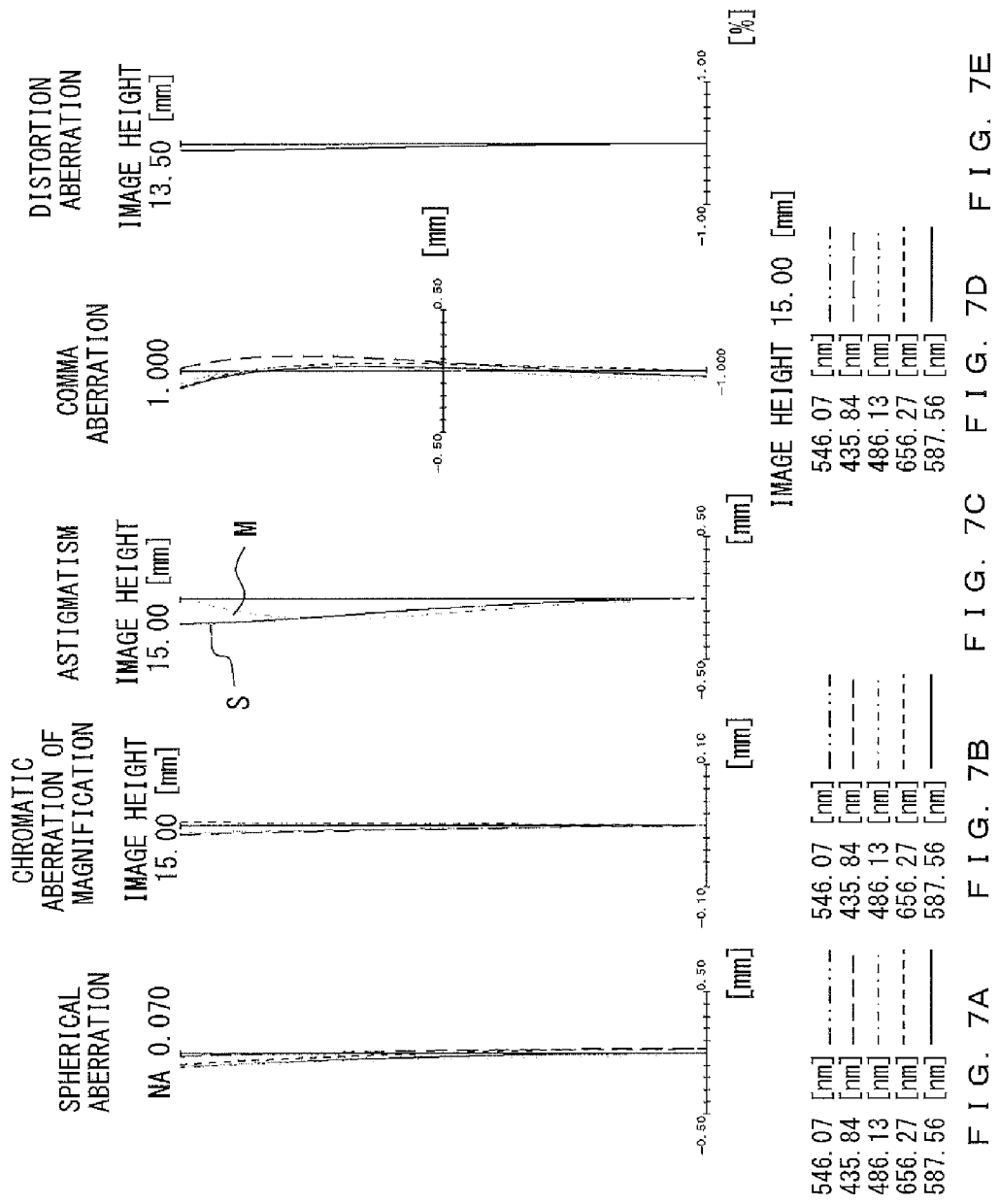
FIG. 7A through FIG. 7E are aberration diagrams of the tube lens exemplified in FIG. 6, and respectively show a spherical aberration, a chromatic aberration of magnification, astigmatism, a comma aberration and a distortion aberration.

FIG. 6 is a sectional view of a tube lens 30 according to the present example. The tube lens 30 exemplified in FIG. 6 is a microscope tube lens that forms an enlarged image of an object by being combined with an infinity-corrected objective. The tube lens 30 includes, in the order from the object side, a first lens group G1, having positive power, that includes a cemented lens CL1, a second lens group G2 having negative power and a third lens group G3, having positive power as a whole, that consists of a plurality of lenses (L6 and L7) each having positive power. Note that the boundaries between the first lens group G1, the second lens group G2 and the third lens group G3 are identified in a manner similar to that in example 1.

The first lens group G1 includes, in the order from the object side, a meniscus lens L1 with positive power having the convex surface facing toward the object side, and a cemented lens CL1 (first lens) including a meniscus lens L2 with positive power having the convex surface facing toward the object side and a meniscus lens L3 with negative power having the convex surface facing toward the object side. The second lens group G2 includes, in the order from the object side, a cemented lens CL2 (second lens) including a meniscus lens L4 with negative power having the concave surface facing toward the object side and a meniscus lens L5 with positive power having the concave surface facing toward the object side. The third lens group G3 includes, from the object side, a meniscus lens L6 (third lens) with positive power having the concave surface facing toward the object side and a meniscus lens L7 (fourth lens) with positive power having the convex surface facing toward the object side. The first lens and the second lens respectively employ meniscus shapes.

Data of the tube lens 30 is as below. Note that the reference wavelength is d line (587.56 nm).
NA=0.07, FN=30 mm,
ε=0.010248 mm, EXP1=1999.9441 mm
FL=180 mm, FLG1=256.5571 mm, FLG2=−254.0083 mm
D0=214.1499 mm, D1=110.7824 mm, D2=62.2 mm
FLG3a=291.7965 mm, FLG3b=341.1723 mm
Ea=17.925 mm, Ec=19.52 mm Lens data of the tube lens 30 is as below. Note that the surface represented by surface number s0 is the surface of the position of the entrance pupil of the tube lens 30 (position of the exit pupil of the objective), and the surface represented by surface number s13 is the imaging plane.

| Tube lens 30 | | | | |
|---|---|---|---|---|
| s | r | d | nd | vd |
| s0 | inf | 162.0987 | | |
| s1 | 96.8617 | 8.2794 | 1.497 | 81.54 |
| s2 | 697.1144 | 2.9741 | | |
| s3 | 41.59 | 14.0615 | 1.497 | 81.54 |
| s4 | 283.4336 | 6 | 1.51633 | 64.14 |
| s5 | 31.9707 | 20.3068 | | |

-continued

| Tube lens 30 | | | | |
|---|---|---|---|---|
| s | r | d | nd | vd |
| s6 | −62.9229 | 8.0051 | 1.74951 | 35.33 |
| s7 | −920.5505 | 7.7895 | 1.43875 | 94.93 |
| s8 | −64.3308 | 14.6329 | | |
| s9 | −283.2239 | 5.8629 | 1.59522 | 67.74 |
| s10 | −108.4929 | 0.1694 | | |
| s11 | 97.7459 | 15.286 | 1.85026 | 32.27 |
| s12 | 136.8257 | 110.782381 | | |
| s13 | inf | | | |

As represented by expressions (1C) through (18C) below, the tube lens 30 satisfies condition expressions (1) through (18), excluding condition expression (10). Note that expressions (1C) through (18C) correspond to condition expressions (1) through (18), respectively. Also, expression (17C) is calculation that uses an example of the principal ray incident on the position with the field number of 30.

$$NA=0.07 \quad (1C)$$

$$FN/\epsilon=2927 \quad (2C)$$

$$FN/EXP1=0.015 \quad (3C)$$

$$D2/FL=0.346 \quad (4C)$$

$$FLG1/FL=1.425 \quad (5C)$$

$$FLG2/FL=-1.411 \quad (6C)$$

$$D1/D0=0.517 \quad (7C)$$

$$v1-vs=59.600 \quad (8C)$$

$$v11-vs1=59.600 \quad (9C)$$

$$v12-vs2=17.400 \quad (10C)$$

$$|RG2/RG1|=1.968 \quad (11C)$$

$$NdG2=1.750 \quad (12C)$$

$$vdG1=91.930 \quad (13C)$$

$$FLG3b/FLG3a=1.169 \quad (14C)$$

$$NdG3=1.850 \quad (15C)$$

$$vdG3=32.270 \quad (16C)$$

$$Ha/Hi=0.346 \quad (17C)$$

$$(Ea-Ec)/FL=-0.009 \quad (18C)$$

FIG. 7A through FIG. 7E are aberration diagrams of the tube lens 30 exemplified in FIG. 6, and show aberrations on the imaging plane in a case when the parallel light beam is incident from the object side. The types of these aberration diagrams are similar to those in example 1.

Example 4

Figure 8:
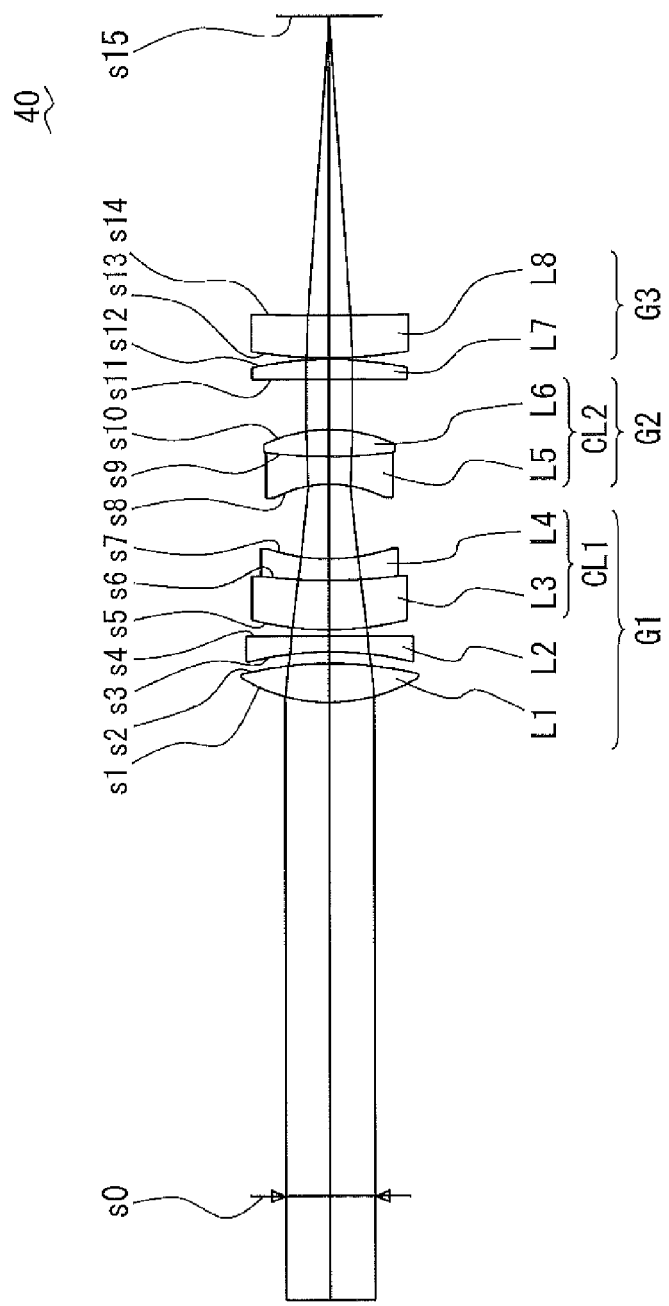
FIG. 8 is a sectional view of a tube lens according to example 4 of the present invention.
Figure 9:
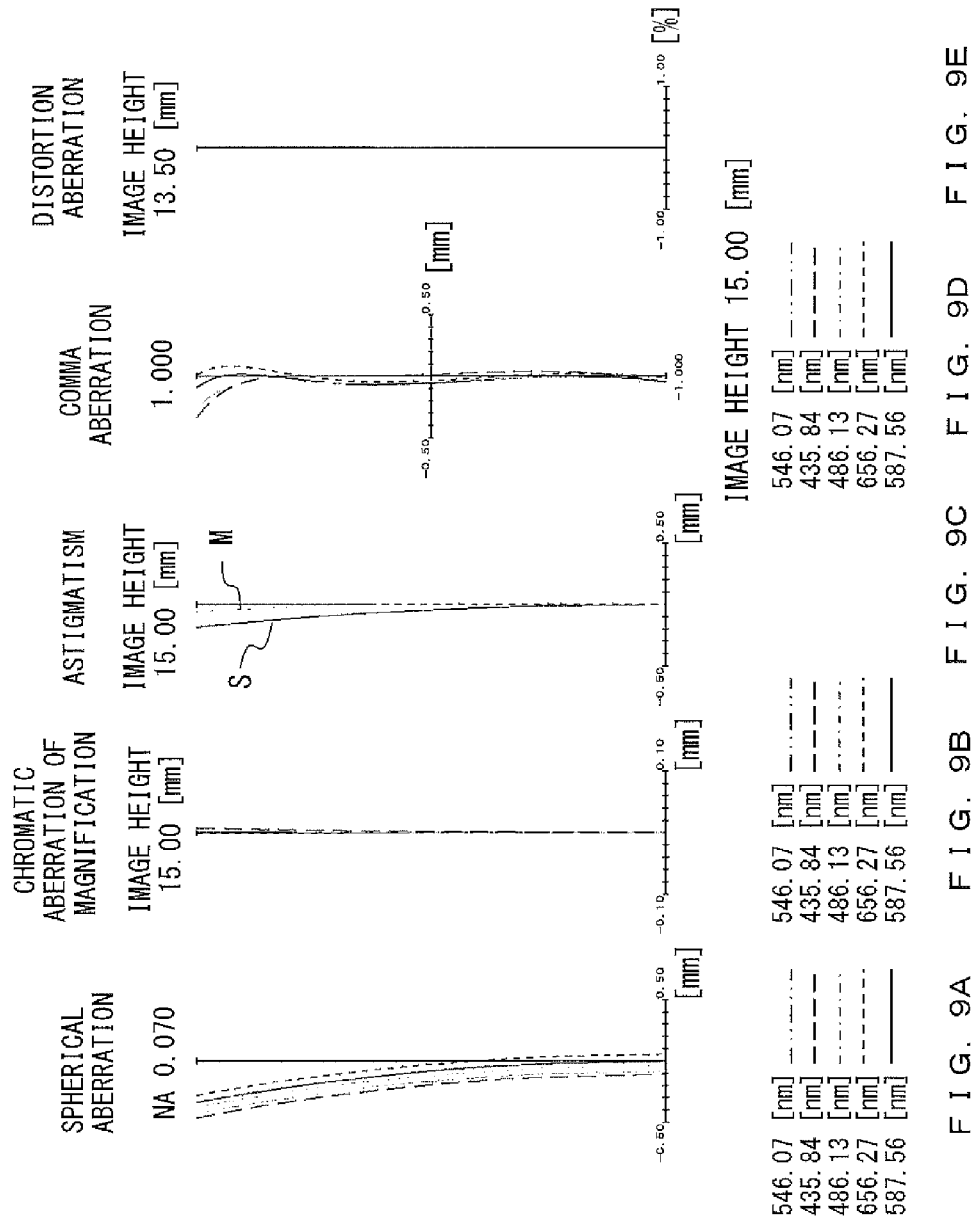
FIG. 9A through FIG. 9E are aberration diagrams of the tube lens exemplified in FIG. 8, and respectively show a spherical aberration, a chromatic aberration of magnification, astigmatism, a comma aberration and a distortion aberration.

FIG. 8 is a sectional view of a tube lens 40 according to the present example. The tube lens 40 exemplified in FIG. 8 is a microscope tube lens that forms an enlarged image of an object by being combined with an infinity-corrected objective. The tube lens 40 includes, in the order from the object side, a first lens group G1, having positive power, that includes a cemented lens CL1, a second lens group G2 having negative power and a third lens group G3, having positive power as a whole, that consists of a plurality of lenses (L7 and L8) each having positive power. Note that the boundaries between the first lens group G1, the second lens group G2 and the third lens group G3 are identified in a manner similar to that in example 1.

The first lens group G1 includes, in the order from the object side, a biconvex lens L1, a meniscus lens L2 with negative power having the concave surface facing toward the object side, and a cemented lens CL1 (first lens) including a meniscus lens L3 with positive power having the convex surface facing toward the object side and a meniscus lens L4 with negative power having the convex surface facing toward the object side. The second lens group G2 includes, in the order from the object side, a cemented lens CL2 (second lens) including a biconcave lens L5 and a biconvex lens L6. The third lens group G3 includes, from the object side, a meniscus lens L7 (third lens) with positive power having the concave surface facing toward the object side and a meniscus lens L8 (fourth lens) with positive power having the convex surface facing toward the object side. The first lens and the second lens respectively employ meniscus shapes.

Data of the tube lens 40 is as below. Note that the reference wavelength is d line (587.56 nm).

NA=0.07, FN=30 mm,
$\epsilon$=0.010248 mm, EXP1=1998.71 mm
FL=180 mm, FLG1=126.3122 mm, FLG2=−64.4325 mm
D0=197.606 mm, D1=111.3848 mm, D2=122.976 mm
FLG3a=92.0611 mm, FLG3b=193.5887 mm
Ea=25.037 mm, Ec=22.181 mm Lens data of the tube lens 40 is as below. Note that the surface represented by surface number s0 is the surface of the position of the entrance pupil of the tube lens 40 (position of the exit pupil of the objective), and the surface represented by surface number s15 is the imaging plane.

| Tube lens 40 | | | | |
|---|---|---|---|---|
| s | r | d | nd | vd |
| s0 | inf | 197.606 | | |
| s1 | 47.7341 | 11.1697 | 1.497 | 81.54 |
| s2 | −103.5787 | 3.3443 | | |
| s3 | −95.8974 | 4.5224 | 1.6516 | 58.55 |
| s4 | −4981.427 | 1.8525 | | |
| s5 | 84.0206 | 14.2254 | 1.497 | 81.54 |
| s6 | 152.7909 | 6.2341 | 1.51633 | 64.14 |
| s7 | 54.2161 | 21.4746 | | |
| s8 | −33.2007 | 7.938 | 1.83481 | 42.71 |
| s9 | 141.3339 | 7.7303 | 1.43875 | 94.93 |
| s10 | −43.4424 | 14.4918 | | |
| s11 | −3446.5792 | 5.7559 | 1.59522 | 67.74 |
| s12 | −101.9063 | 0.4627 | | |
| s13 | 141.6394 | 12.183 | 1.85026 | 32.27 |
| s14 | 978.5669 | 86.2206 | | |
| s15 | inf | | | |

As represented by expressions (1D) through (18D) below, the tube lens 40 satisfies condition expressions (1) through (18), excluding condition expression (10). Note that expressions (1D) through (18D) correspond to condition expressions (1) through (18), respectively. Also, expression (17D) is calculation that uses an example of the principal ray incident on the position with the field number of 30.

$$NA=0.07 \quad (1D)$$

$$FN/\epsilon=2927 \quad (2D)$$

FN/EXP1=0.015 (3D)

D2/FL=0.683 (4D)

FLG1/FL=0.702 (5D)

FLG2/FL=−0.358 (6D)

D1/D0=0.564 (7D)

ν1−νs=52.220 (8D)

ν11−νs1=52.220 (9D)

ν12−νs2=17.400 (10D)

|RG2/RG1|=0.612 (11D)

NdG2=1.835 (12D)

νdG1=81.540 (13D)

FLG3b/FLG3a=2.103 (14D)

NdG3=1.850 (15D)

νdG3=32.270 (16D)

Ha/Hi=0.346 (17D)

(Ea−Ec)/FL=0.016 (18D)

FIG. 9A through FIG. 9E are aberration diagrams of the tube lens 40 exemplified in FIG. 8, and show aberrations on the imaging plane in a case when the parallel light beam is incident from the object side. The types of these aberration diagrams are similar to those in example 1.

Example 5

Figure 10:
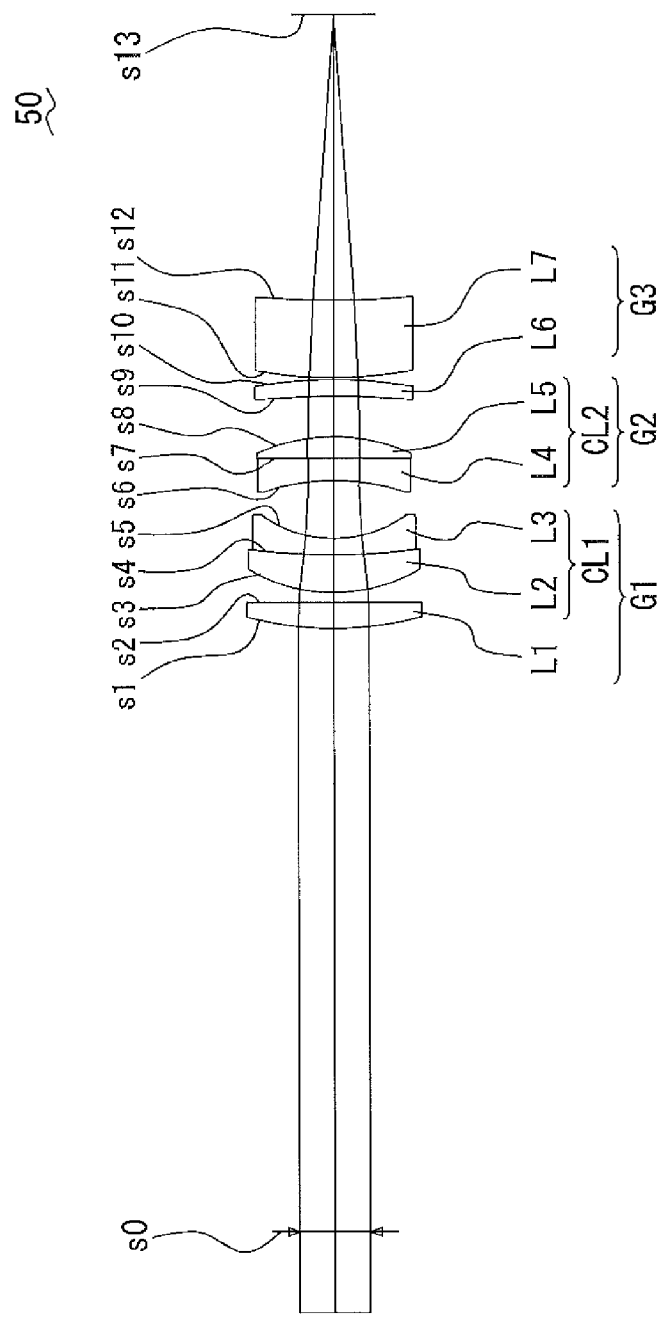
FIG. 10 is a sectional view of a tube lens according to example 5 of the present invention.
Figure 11:
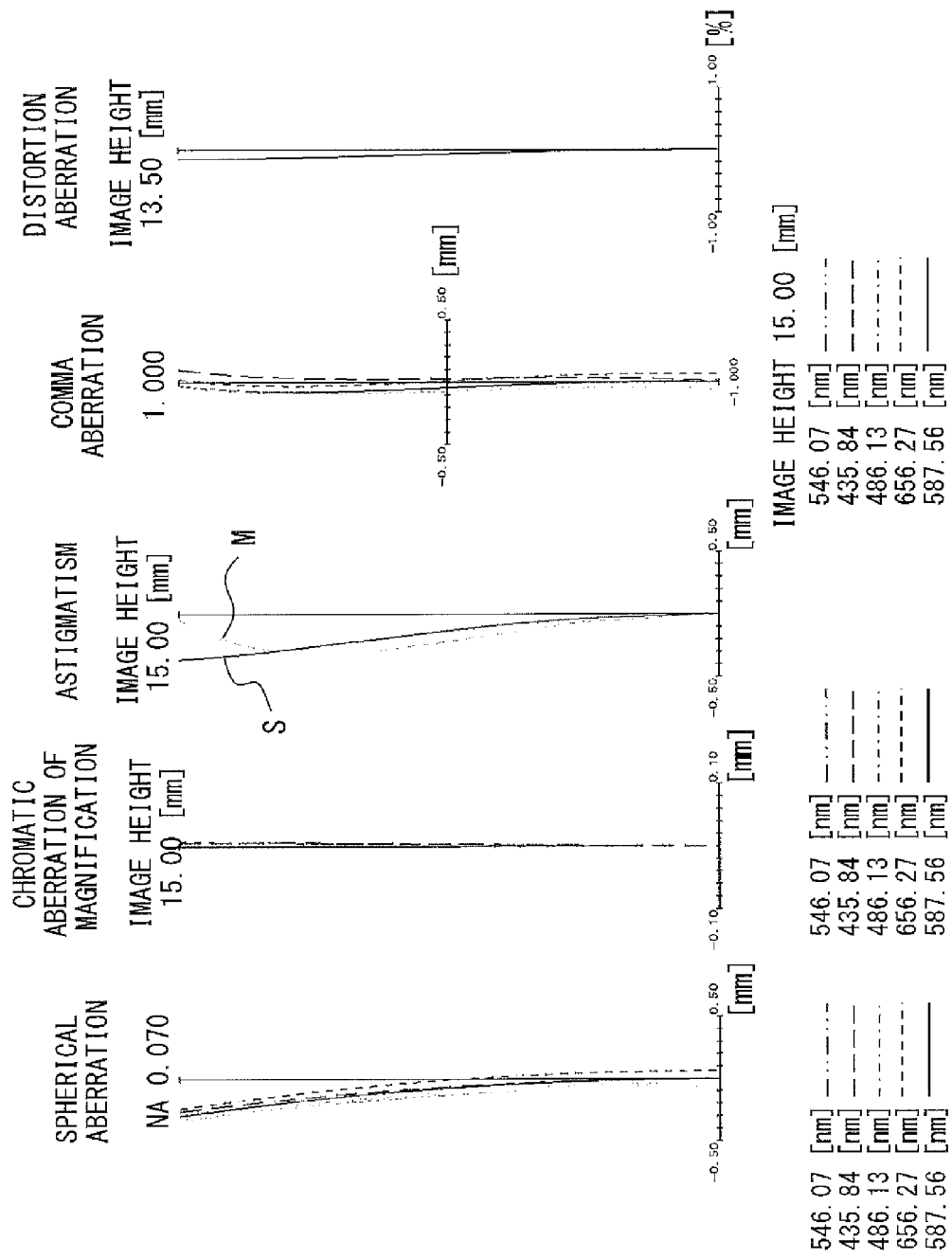
FIG. 11A through FIG. 11E are aberration diagrams of the tube lens exemplified in FIG. 10, and respectively show a spherical aberration, a chromatic aberration of magnification, astigmatism, a comma aberration and a distortion aberration.

FIG. 10 is a sectional view of a tube lens 50 according to the present example. The tube lens 50 exemplified in FIG. 10 is a microscope tube lens that forms an enlarged image of an object by being combined with an infinity-corrected objective. The tube lens 50 includes, in the order from the object side, a first lens group G1, having positive power, that includes a cemented lens CL1, a second lens group G2 having negative power and a third lens group G3, having positive power as a whole, that consists of a plurality of lenses (L6 and L7) each having positive power. Note that the boundaries between the first lens group G1, the second lens group G2 and the third lens group G3 are identified in a manner similar to that in example 1.

The first lens group G1 includes, in the order from the object side, a biconvex lens L1 and a cemented lens CL1 (first lens) including a meniscus lens L2 with positive power having the convex surface facing toward the object side and a meniscus lens L3 with negative power having the convex surface facing toward the object side. The second lens group G2 includes, in the order from the object side, a cemented lens CL2 (second lens) including a meniscus lens L4 with negative power having the concave surface facing toward the object side and a meniscus lens L5 with positive power having the concave surface facing toward the object side. The third lens group G3 includes, from the object side, a meniscus lens L6 (third lens) with positive power having the concave surface facing toward the object side and a meniscus lens L7 (fourth lens) with positive power having the convex surface facing toward the object side. The first lens and the second lens respectively employ meniscus shapes.

Data of the tube lens 50 is as below. Note that the reference wavelength is d line (587.56 nm).
NA=0.07, FN=30 mm,
ϵ=0.010248 mm, EXP1=425.27 mm
FL=180 mm, FLG1=260.3535 mm, FLG2=−573.9846 mm
D0=226.03778 mm, D1=120.9627 mm, D2=222.2 mm
FLG3a=748.3104 mm, FLG3b=318.4502 mm
Ea=31.497 mm, Ec=28.291 mm Lens data of the tube lens 50 is as below. Note that the surface represented by surface number s0 is the surface of the position of the entrance pupil of the tube lens 50 (position of the exit pupil of the objective), and the surface represented by surface number s13 is the imaging plane.

| | Tube lens 50 | | | |
|---|---|---|---|---|
| s | r | d | nd | νd |
| s0 | inf | 222.2 | | |
| s1 | 117.8297 | 9.5763 | 1.43875 | 94.93 |
| s2 | −49640 | 3.6719 | | |
| s3 | 59.5431 | 13.9171 | 1.618 | 63.33 |
| s4 | 233.3093 | 6 | 1.51633 | 64.14 |
| s5 | 42.9641 | 21.3163 | | |
| s6 | −78.9796 | 8.1503 | 1.72047 | 34.71 |
| s7 | −2823.7449 | 7.9336 | 1.43875 | 94.93 |
| s8 | −65.9063 | 14.9811 | | |
| s9 | −282.8478 | 6.0675 | 1.497 | 81.54 |
| s10 | −161.8049 | 0.7369 | | |
| s11 | 152.7821 | 28.6118 | 1.83481 | 42.71 |
| s12 | 328.6289 | 105.075038 | | |
| s13 | inf | | | |

As represented by expressions (1E) through (18E) below, the tube lens 50 satisfies condition expressions (1) through (18), excluding condition expression (10). Note that expressions (1E) through (18E) correspond to condition expressions (1) through (18), respectively. Also, expression (17E) is calculation that uses an example of the principal ray incident on the position with the field number of 30.

NA=0.07 (1E)

FN/ϵ=2927 (2E)

FN/EXP1=0.071 (3E)

D2/FL=1.234 (4E)

FLG1/FL=1.446 (5E)

FLG2/FL=−3.189 (6E)

D1/D0=0.535 (7E)

ν1−νs=60.220 (8E)

ν11−νs1=60.220 (9E)

ν12−νs2=0.810 (10E)

|RG2/RG1|=1.838 (11E)

NdG2=1.720 (12E)

νdG1=94.930 (13E)

FLG3b/FLG3a=0.426 (14E)

NdG3=1.935 (15E)

νdG3=42.710 (16E)

$$Ha/Hi=1.244 \quad (17E)$$

$$(Ea-Ec)/FL=0.018 \quad (18E)$$

FIG. 11A through FIG. 11E are aberration diagrams of the tube lens 50 exemplified in FIG. 10, and show aberrations on the imaging plane in a case when the parallel light beam is incident from the object side. The types of these aberration diagrams are similar to those in example 1.

Example 6

Figure 12:
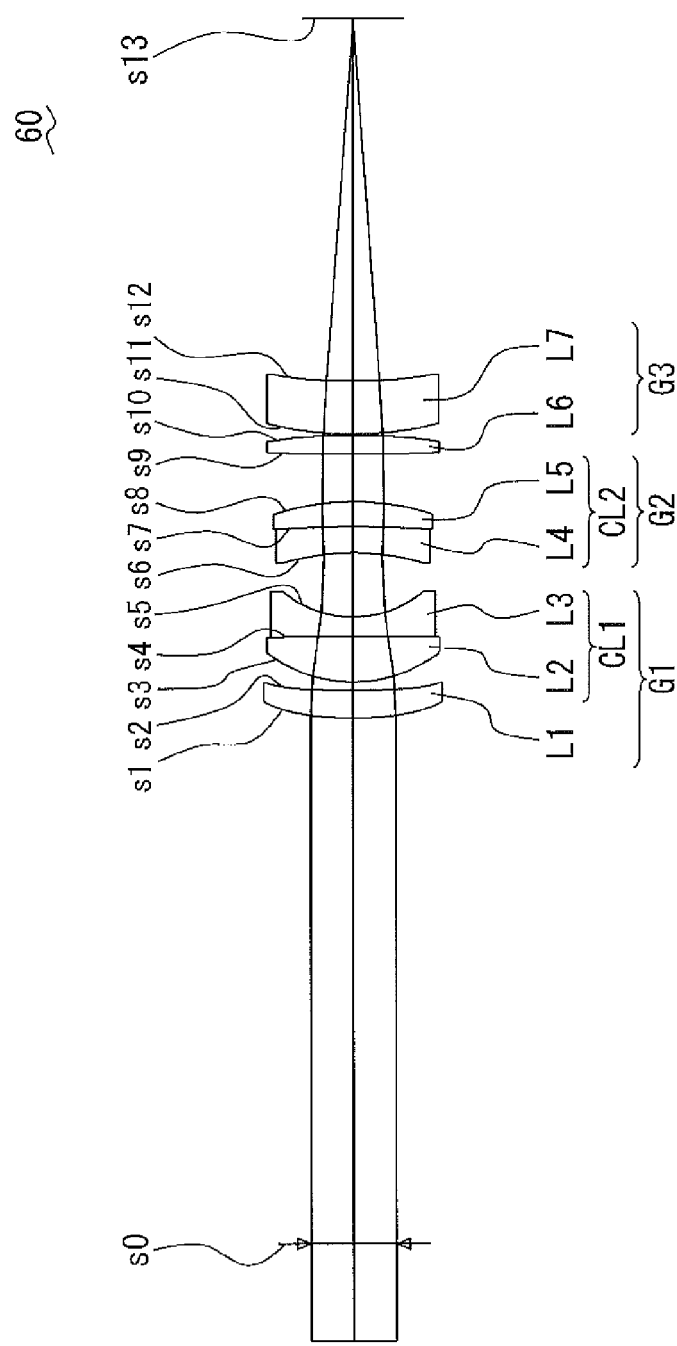
FIG. 12 is a sectional view of a tube lens according to example 6 of the present invention.
Figure 13:
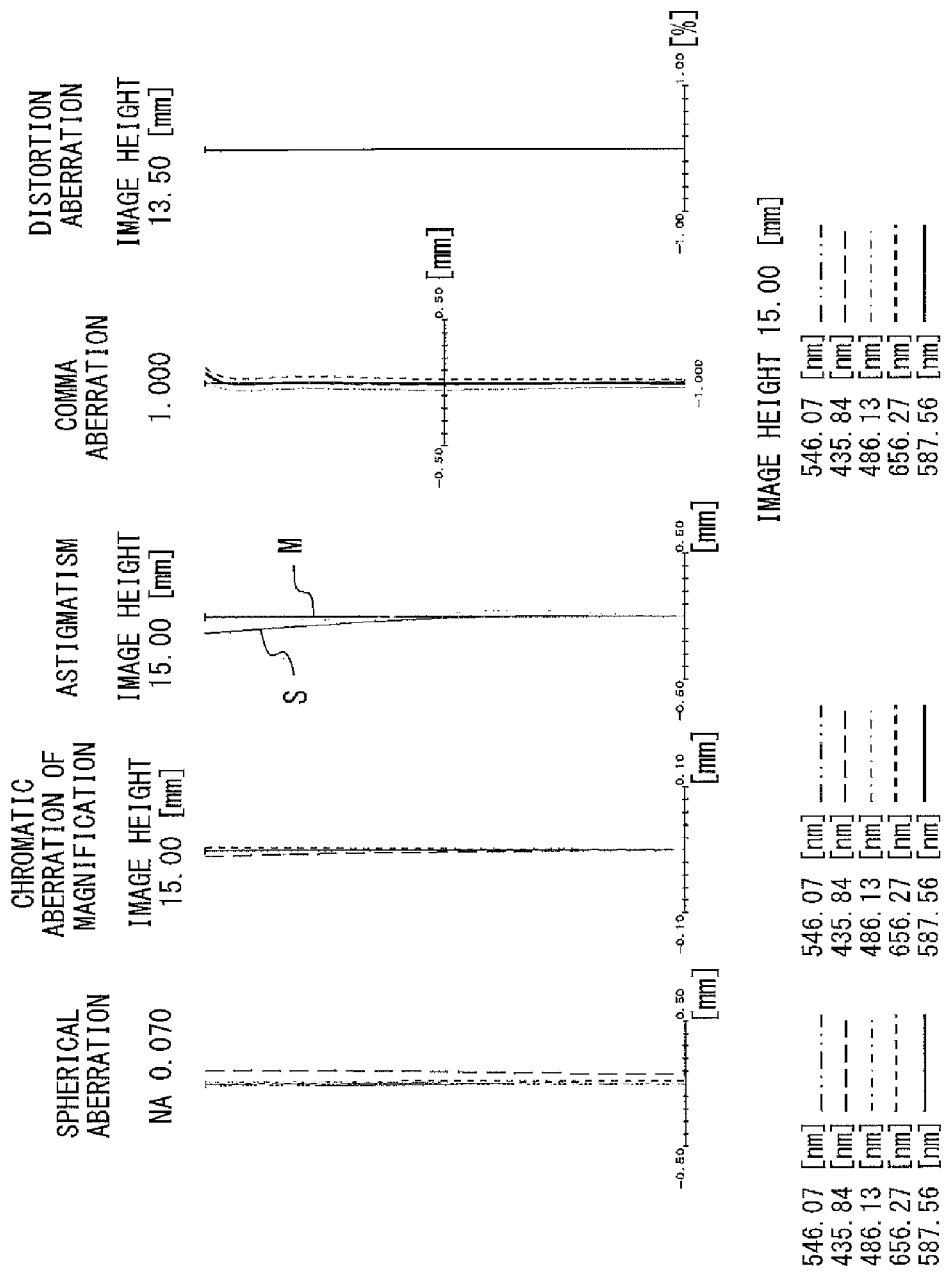
FIG. 13A through FIG. 13E are aberration diagrams of the tube lens exemplified in FIG. 12, and respectively show a spherical aberration, a chromatic aberration of magnification, astigmatism, a comma aberration and a distortion aberration.

FIG. 12 is a sectional view of a tube lens 60 according to the present example. The tube lens 60 exemplified in FIG. 12 is a microscope tube lens that forms an enlarged image of an object by being combined with an infinity-corrected objective. The tube lens 60 includes, in the order from the object side, a first lens group G1, having positive power, that includes a cemented lens CL1, a second lens group G2 having negative power and a third lens group G3, having positive power as a whole, that consists of a plurality of lenses (L6 and L7) each having positive power. Note that the boundaries between the first lens group G1, the second lens group G2 and the third lens group G3 are identified in a manner similar to that in example 1.

The first lens group G1 includes, in the order from the object side, a meniscus lens (aspheric lens) L1 with positive power having the convex surface facing toward the object side, and a cemented lens CL1 (first lens) including a biconvex lens L2 and a biconcave lens L3. The second lens group G2 includes, in the order from the object side, a cemented lens CL2 (second lens) including a meniscus lens L4 with negative power having the concave surface facing toward the object side and a meniscus lens L5 with positive power having the concave surface facing toward the object side. The third lens group G3 includes, from the object side, a meniscus lens L6 (third lens, aspheric lens) with positive power having the concave surface facing toward the object side and a meniscus lens L7 (fourth lens, aspheric lens) with positive power having the convex surface facing toward the object side. The first lens and the second lens respectively employ meniscus shapes. The lenses L1, L6 and L7 are aspheric lenses, which are lenses whose both surfaces are aspheric.

Data of the tube lens 60 is as below. Note that the reference wavelength is d line (587.56 nm).

NA=0.07, FN=30 mm,

Σ=0.010248 mm, EXP1=1978.7006 mm

FL=180 mm, FLG1=306.3939 mm, FLG2=−368.7981 mm

D0=215.8317 mm, D1=103.9357 mm, D2=162.2 mm

FLG3a=352.5076 mm, FLG3b=312.6439 mm

Ea=26.536 mm, Ec=25.611 mm

Lens data of the tube lens 60 is as below. Note that the surface represented by surface number s0 is the surface of the position of the entrance pupil of the tube lens 60 (position of the exit pupil of the objective), and the surface represented by surface number s13 is the imaging plane. Also, "*" beside surface numbers indicate that the surfaces are aspheric.

| Tube lens 60 | | | | |
|---|---|---|---|---|
| s | r | d | nd | vd |
| s0 | inf | 162.2 | | |
| s1* | 102.094 | 8.64 | 1.497 | 81.54 |
| s2* | 430.3744 | 2.5322 | | |
| s3 | 40.6782 | 14.02 | 1.497 | 81.54 |
| s4 | −1456.2435 | 5.9978 | 1.51633 | 64.14 |
| s5 | 31.4159 | 19.7771 | | |
| s6 | −71.3563 | 8.012 | 1.72047 | 34.71 |
| s7 | −352.2736 | 7.8017 | 1.43875 | 94.93 |
| s8 | −73.5208 | 14.6525 | | |
| s9* | −802.0276 | 5.8765 | 1.43875 | 94.93 |
| s10* | −159.9876 | 0.2926 | | |
| s11* | 102.985 | 16.3333 | 1.834 | 37.16 |
| s12* | 167.4128 | 111.8960111 | | |
| s13 | inf | | | |

Aspheric data of the tube lens 60 is as below. In this example, the aspheric shape is expressed by the equation below, where Z is the coordinate in the direction of the optical axis of the aspheric surface, Y is the coordinate in the direction orthogonal to the optical axis of the aspheric surface, K is the conic constant, r is the curvature radius in a paraxial region of the aspheric surface, A2, A4, A6 and A8 are the second aspheric coefficient, the fourth aspheric coefficient, the sixth aspheric coefficient and the eighth aspheric coefficient, respectively, and E represents exponential of 10.

$$Z = \frac{Y^2}{r + r\sqrt{1-(K+1)(Y/r)^2}} + A2Y^2 + A4Y^4 + A6Y^6 + A8Y^8$$

| First surface s1 | | | |
|---|---|---|---|
| K = −2 | A2 = 2.27E−04 | A4 = 1.64E−06 | A6 = 1.20E−09 |
| A8 = 1.02E−12 | | | |

| Second surface s2 | | | |
|---|---|---|---|
| K = −0.0716 | A2 = 7.20E−05 | A4 = 1.75E−06 | A6 = 1.41E−09 |
| A8 = 1.29E−12 | | | |

-continued

Ninth surface s9

K = −0.1061   A2 = 3.32E−04   A4 = 3.98E−06   A6 = −6.42E−09
A8 = 4.60E−12

Tenth surface s10

K = −159.9876   A2 = −3.9518E−04   A4 = 3.36E−06   A6 = −7.13E−09
A8 = 4.42E−12

Eleventh surface s11

K = 102.985   A2 = −9.02E−05   A4 = 4.16E−08   A6 = 1.62E−09
A8 = −1.27E−12

Twelfth surface s12

K = 167.4128   A2 = 7.75E−05   A4 = 1.17E−07   A6 = 3.29E−09
A8 = −2.40E−12

As represented by expressions (1F) through (18F) below, the tube lens 60 satisfies condition expressions (1) through (18), excluding condition expression (10). Note that expressions (1F) through (18F) correspond to condition expressions (1) through (18), respectively. Also, expression (17F) is calculation that uses an example of the principal ray incident on the position with the field number of 30.

$$NA=0.07 \tag{1F}$$

$$FN/\epsilon=2927 \tag{2F}$$

$$FN/EXP1=0.015 \tag{3F}$$

$$D2/FL=0.901 \tag{4F}$$

$$FLG1/FL=1.702 \tag{5F}$$

$$FLG2/FL=-2.049 \tag{6F}$$

$$D1/D0=0.482 \tag{7F}$$

$$\nu1-\nu s=60.220 \tag{8F}$$

$$\nu11-\nu s1=60.220 \tag{9F}$$

$$\nu12-\nu s2=17.400 \tag{10F}$$

$$|RG2/RG1|=2.271 \tag{11F}$$

$$NdG2=1.720 \tag{12F}$$

$$\nu dG1=81.540 \tag{13F}$$

$$FLG3b/FLG3a=0.887 \tag{14F}$$

$$NdG3=1.834 \tag{15F}$$

$$\nu dG3=37.160 \tag{16F}$$

$$Ha/Hi=0.907 \tag{17F}$$

$$(Ea-Ec)/FL=0.005 \tag{18F}$$

FIG. 13A through FIG. 13E are aberration diagrams of the tube lens 60 exemplified in FIG. 12, and show aberrations on the imaging plane in a case when the parallel light beam is incident from the object side. The types of these aberration diagrams are similar to those in example 1.

Example 7

Figure 14:
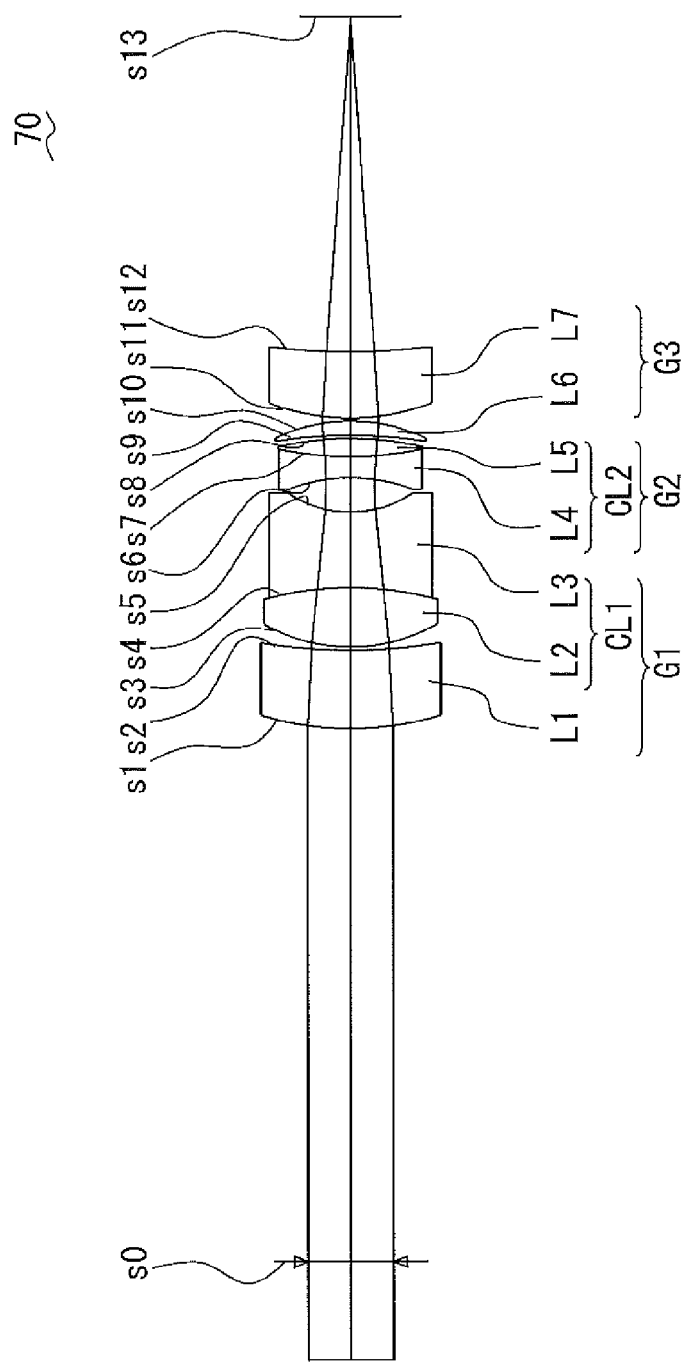
FIG. 14 is a sectional view of a tube lens according to example 7 of the present invention.
Figure 15:
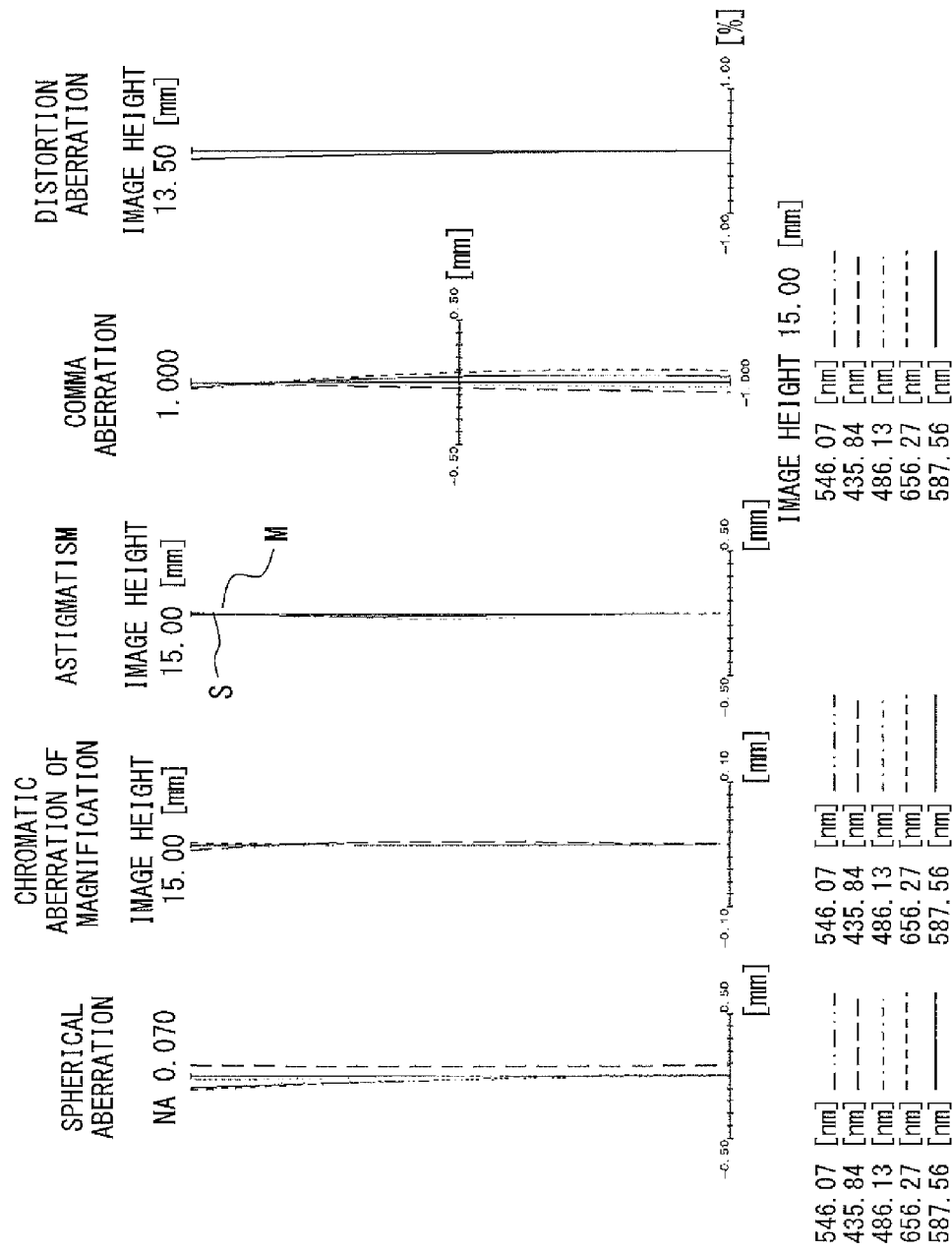
FIG. 15A through FIG. 15E are aberration diagrams of the tube lens exemplified in FIG. 14, and respectively show a spherical aberration, a chromatic aberration of magnification, astigmatism, a comma aberration and a distortion aberration.

FIG. 14 is a sectional view of a tube lens 70 according to the present example. The tube lens 70 exemplified in FIG. 14 is a microscope tube lens that forms an enlarged image of an object by being combined with an infinity-corrected objective. The tube lens 70 includes, in the order from the object side, a first lens group G1, having positive power, that includes a cemented lens CL1, a second lens group G2 having negative power and a third lens group G3, having positive power as a whole, that consists of a plurality of lenses (L6 and L7) each having positive power. Note that the boundaries between the first lens group G1, the second lens group G2 and the third lens group G3 are identified in a manner similar to that in example 1.

The first lens group G1 includes, in the order from the object side, a meniscus lens L1 having the convex surface facing toward the object side, and a cemented lens CL1 (first lens) including a biconvex lens L2 and a biconcave lens L3. The second lens group G2 includes, in the order from the object side, a cemented lens CL2 (second lens) including a biconcave lens L4 and a biconvex lens L5. The third lens group G3 includes, from the object side, a meniscus lens L6 (third lens) with positive power having the concave surface facing toward the object side and a meniscus lens L7 (fourth lens) with positive power having the convex surface facing toward the object side. The first lens and the second lens respectively employ meniscus shapes.

Data of the tube lens 70 is as below. Note that the reference wavelength is d line (587.56 nm).
NA=0.07, FN=30 mm,
ϵ=0.010248 mm, EXP1=6143 mm
FL=180 mm, FLG1=503.2624 mm, FLG2=−81.4779 mm
D0=216.412 mm, D1=114.4765 mm, D2=162.2 mm
FLG3a=136.7465 mm, FLG3b=111.324 mm
Ea=26.47 mm, Ec=23.951 mm Lens data of the tube lens 70 is as below. Note that the surface represented by surface number s0 is the surface of the position of the entrance pupil of the tube lens 70 (position of the exit pupil of the objective), and the surface represented by surface number s13 is the imaging plane.

| Tube lens 70 | | | | |
|---|---|---|---|---|
| s | r | d | nd | vd |
| s0 | inf | 162.2 | | |
| s1 | 89.9591 | 23.7981 | 1.497 | 81.54 |
| s2 | 158.2414 | 1 | | |
| s3 | 50.3216 | 18.0151 | 1.497 | 81.54 |
| s4 | −95.0291 | 23.0142 | 1.51633 | 64.14 |
| s5 | 32.3459 | 10.4065 | | |
| s6 | −49.5543 | 6.4182 | 1.72047 | 34.71 |
| s7 | 99.1751 | 5.5 | 1.43875 | 94.93 |

-continued

Tube lens 70

| s | r | d | nd | vd |
|---|---|---|---|---|
| s8 | −93.5214 | 1 | | |
| s9 | −132.5229 | 4.246 | 1.59522 | 67.74 |
| s10 | −51.027 | 1 | | |
| s11 | 65.2304 | 20.0785 | 1.85026 | 32.27 |
| s12 | 180.1594 | 101.935897 | | |
| s13 | inf | | | |

As represented by expressions (1G) through (18G) below, the tube lens 70 satisfies condition expressions (1) through (18), excluding condition expression (10). Note that expressions (1G) through (18G) correspond to condition expressions (1) through (18), respectively. Also, expression (17G) is calculation that uses an example of the principal ray incident on the position with the field number of 30.

$NA=0.07$ (1G)

$FN/\epsilon=2927$ (2G)

$FN/EXP1=0.005$ (3G)

$D2/FL=0.901$ (4G)

$FLG1/FL=2.796$ (5G)

$FLG2/FL=-0.453$ (6G)

$D1/D0=0.529$ (7G)

$v1-vs=60.220$ (8G)

$v11-vs1=60.220$ (9G)

$v12-vs2=17.400$ (10G)

$|RG2/RG1|=1.532$ (11G)

$NdG2=1.720$ (12G)

$vdG1=81.540$ (13G)

$FLG3b/FLG3a=0.814$ (14G)

$NdG3=1.850$ (15G)

$vdG3=32.270$ (16G)

$Ha/Hi=0.909$ (17G)

$(Ea-Ec)/FL=0.014$ (18G)

FIG. 15A through FIG. 15E are aberration diagrams of the tube lens 70 exemplified in FIG. 14, and show aberrations on the imaging plane in a case when the parallel light beam is incident from the object side. The types of these aberration diagrams are similar to those in example 1.

Example 8

Figure 16:
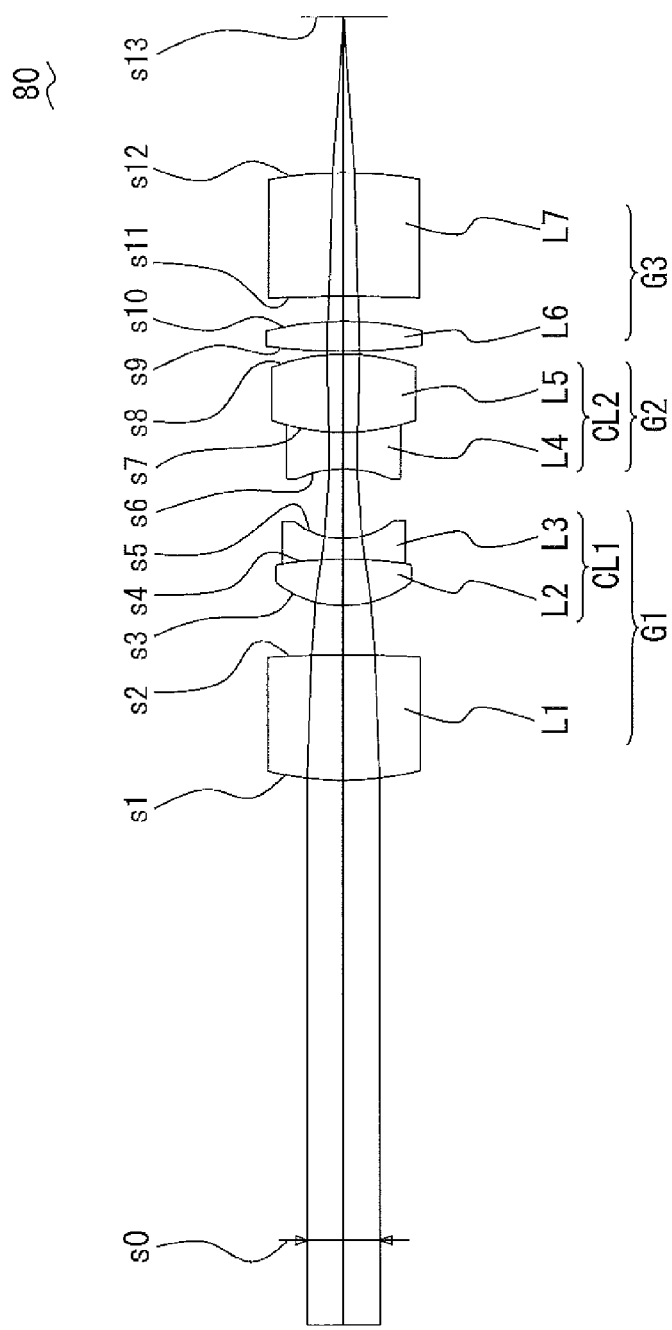
FIG. 16 is a sectional view of a tube lens according to example 8 of the present invention.
Figure 17:
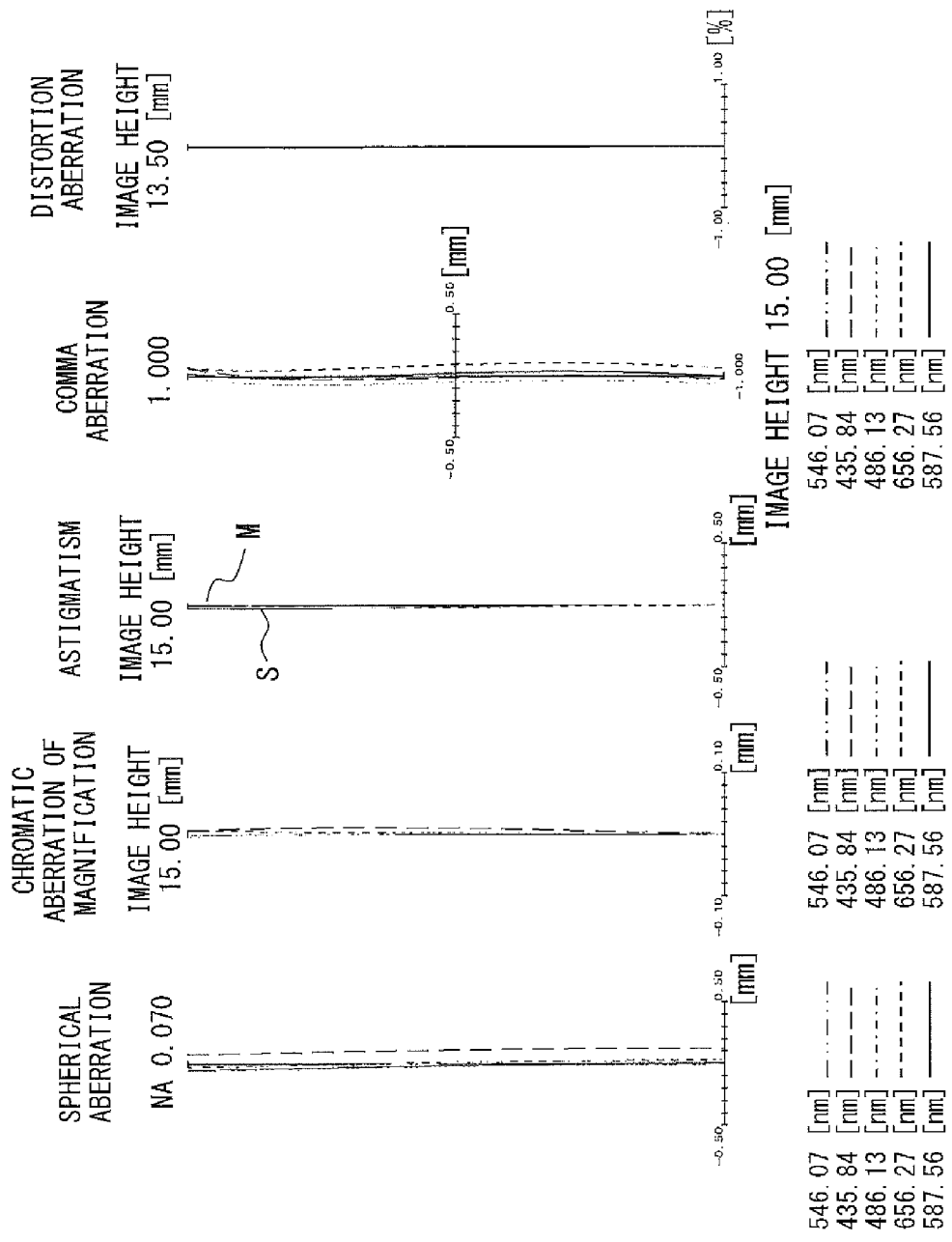
FIG. 17A through FIG. 17E are aberration diagrams of the tube lens exemplified in FIG. 16, and respectively show a spherical aberration, a chromatic aberration of magnification, astigmatism, a comma aberration and a distortion aberration.

FIG. 16 is a sectional view of a tube lens 80 according to the present example. The tube lens 80 exemplified in FIG. 16 is a microscope tube lens that forms an enlarged image of an object by being combined with an infinity-corrected objective. The tube lens 80 includes, in the order from the object side, a first lens group G1, having positive power, that includes a cemented lens CL1, a second lens group G2 having negative power and a third lens group G3, having positive power as a whole, that consists of a plurality of lenses (L6 and L7) each having positive power. Note that the boundaries between the first lens group G1, the second lens group G2 and the third lens group G3 are identified in a manner similar to that in example 1.

The first lens group G1 includes, in the order from the object side, a biconvex lens L1, and a cemented lens CL1 (first lens) including a biconvex lens L2 and a biconcave lens L3. The second lens group G2 includes, in the order from the object side, a cemented lens CL2 (second lens) including a biconcave lens L4 and a biconvex lens L5. The third lens group G3 includes, from the object side, a biconvex lens L6 (third lens) and a meniscus lens L7 (fourth lens) with positive power having the concave surface facing toward the object side. The first lens and the second lens respectively employ meniscus shapes.

Data of the tube lens 80 is as below. Note that the reference wavelength is d line (587.56 nm).
NA=0.07, FN=30 mm,
$\epsilon$=0.010248 mm, EXP1=108.99 mm
FL=180 mm, FLG1=177.491 mm, FLG2=−79.0664 mm
D0=268.9759 mm, D1=214.0886 mm, D2=162.2 mm
FLG3a=102.58 mm, FLG3b=221.0191 mm
Ea=26.387 mm, Ec=27.006 mm Lens data of the tube lens 80 is as below. Note that the surface represented by surface number s0 is the surface of the position of the entrance pupil of the tube lens 80 (position of the exit pupil of the objective), and the surface represented by surface number s13 is the imaging plane.

Tube lens 80

| s | r | d | nd | vd |
|---|---|---|---|---|
| s0 | inf | 162.2 | | |
| s1 | 108.373 | 44.1565 | 1.497 | 81.54 |
| s2 | −420.1585 | 17.4045 | | |
| s3 | 37.7218 | 16.3353 | 1.497 | 81.54 |
| s4 | −147.0718 | 7.2894 | 1.51633 | 64.14 |
| s5 | 26.8628 | 24.5481 | | |
| s6 | −39.8089 | 12.9467 | 1.72047 | 34.71 |
| s7 | 77.0609 | 27.5053 | 1.43875 | 94.93 |
| s8 | −71.3383 | 1 | | |
| s9 | 196.7487 | 10.569 | 1.6968 | 55.53 |
| s10 | −109.7848 | 8.7513 | | |
| s11 | −700 | 43.5824 | 1.85026 | 32.27 |
| s12 | −152.7466 | 54.887315 | | |
| s13 | inf | | | |

As represented by expressions (1H) through (18H) below, the tube lens 80 satisfies condition expressions (1) through (18), excluding condition expression (10). Note that expressions (1H) through (18H) correspond to condition expressions (1) through (18), respectively. Also, expression (17H) is calculation that uses an example of the principal ray incident on the position with the field number of 30.

$NA=0.07$ (1H)

$FN/\epsilon=2927$ (2H)

$FN/EXP1=0.275$ (3H)

$D2/FL=0.901$ (4H)

$FLG1/FL=0.986$ (5H)

$FLG2/FL=-0.439$ (6H)

$D1/D0=0.796$ (7H)

$v1-vs=60.220$ (8H)

$v11-vs1=60.220$ (9H)

$v12-vs2=17.400$ (10H)

$|RG2/RG1|=1.482$ (11H)

$NdG2=1.720$ (12H)

$vdG1=81.540$ (13H)

$FLG3b/FLG3a=2.155$ (14H)

$NdG3=1.850$ (15H)

$vdG3=32.270$ (16H)

$Ha/Hi=0.906$ (17H)

$(Ea-Ec)/FL=-0.003$ (18H)

FIG. 17A through FIG. 17E are aberration diagrams of the tube lens 80 exemplified in FIG. 16, and show aberrations on the imaging plane in a case when the parallel light beam is incident from the object side. The types of these aberration diagrams are similar to those in example 1.

Example 9

Figure 18:
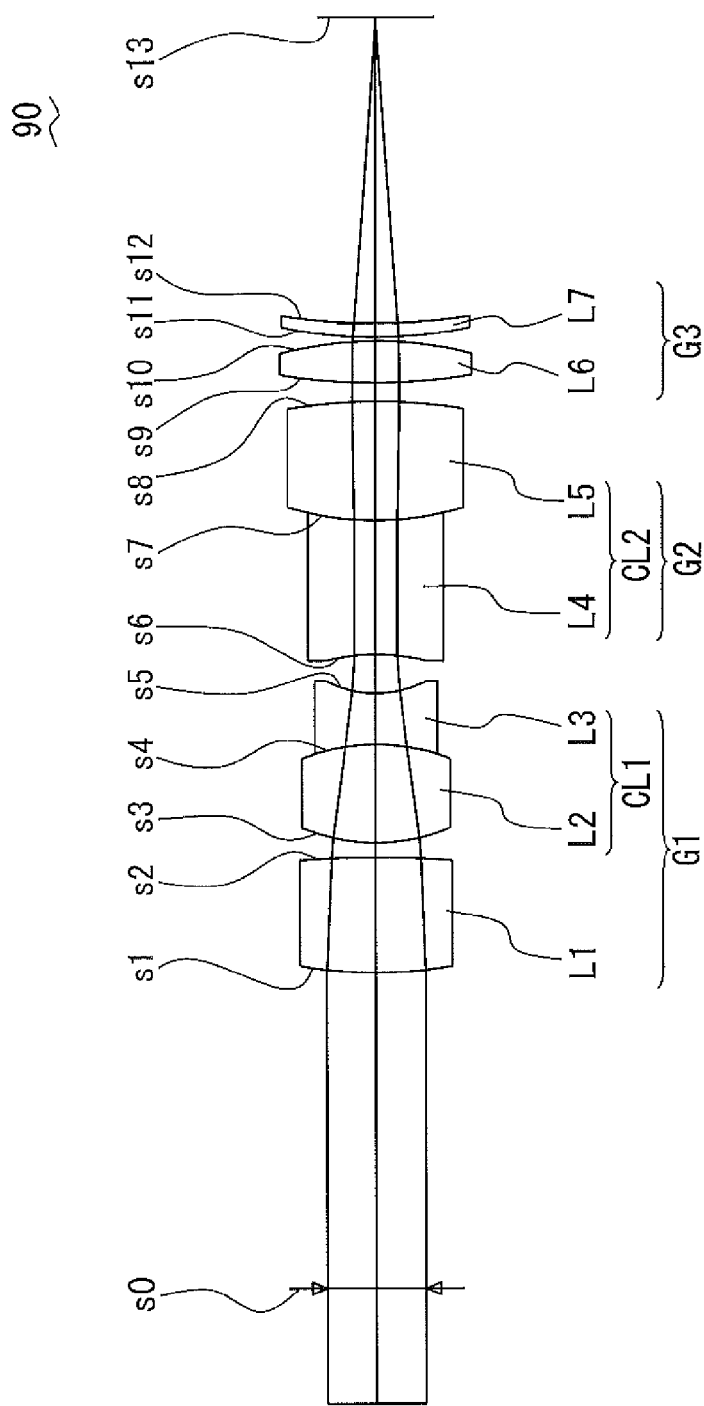
FIG. 18 is a sectional view of a tube lens according to example 9 of the present invention.

FIG. 18 is a sectional view of a tube lens 90 according to the present example. The tube lens 90 exemplified in FIG. 18 is a microscope tube lens that forms an enlarged image of an object by being combined with an infinity-corrected objective. The tube lens 90 includes, in the order from the object side, a first lens group G1, having positive power, that includes a cemented lens CL1, a second lens group G2 having negative power and a third lens group G3, having positive power as a whole, that consists of a plurality of lenses (L6 and L7) each having positive power. Note that the boundaries between the first lens group G1, the second lens group G2 and the third lens group G3 are identified in a manner similar to that in example 1.

The first lens group G1 includes, in the order from the object side, a biconvex lens L1, and a cemented lens CL1 (first lens) including a biconvex lens L2 and a biconcave lens L3. The second lens group G2 includes, in the order from the object side, a cemented lens CL2 (second lens) including a biconcave lens L4 and a biconvex lens L5. The third lens group G3 includes, from the object side, a biconvex lens L6 (third lens) and a meniscus lens L7 (fourth lens) with positive power having the convex surface facing toward the object side. The first lens and the second lens respectively employ meniscus shapes.

Data of the tube lens 90 is as below. Note that the reference wavelength is d line (587.56 nm).
NA=0.07, FN=30 mm,
ε=0.010248 mm, EXP1=358.0679 mm
FL=180 mm, FLG1=176.1303 mm, FLG2=−78.0404 mm
D0=248.8623 mm, D1=169.271 mm, D2=82.2 mm
FLG3a=100.5002 mm, FLG3b=452.1581 mm
Ea=17.918 mm, Ec=24.447 mm Lens data of the tube lens 90 is as below. Note that the surface represented by surface number s0 is the surface of the position of the entrance pupil of the tube lens 90 (position of the exit pupil of the objective), and the surface represented by surface number s13 is the imaging plane.

| Tube lens 90 | | | | |
|---|---|---|---|---|
| s | r | d | nd | vd |
| s0 | inf | 82.2 | | |
| s1 | 109.277 | 30 | 1.497 | 81.54 |
| s2 | −257.1081 | 3.8857 | | |
| s3 | 48.498 | 25.5599 | 1.497 | 81.54 |
| s4 | −52.4895 | 13.3563 | 1.51633 | 64.14 |
| s5 | 26.6665 | 10.0652 | | |
| s6 | −53.2581 | 35 | 1.72047 | 34.71 |
| s7 | 76.7859 | 31.0012 | 1.43875 | 94.93 |
| s8 | −135.6727 | 4.8645 | | |
| s9 | 150.0768 | 10.8424 | 1.59522 | 67.74 |
| s10 | −96.7851 | 1 | | |
| s11 | 115.4106 | 3.696 | 1.85026 | 32.27 |
| s12 | 162.4912 | 79.5913 | | |
| s13 | inf | | | |

As represented by expressions (1I) through (18I) below, the tube lens 90 satisfies condition expressions (1) through (18), excluding condition expressions (10) and (18). Note that expressions (1I) through (18I) correspond to condition expressions (1) through (18), respectively. Also, expression (17I) is calculation that uses an example of the principal ray incident on the position with the field number of 30.

$NA=0.07$ (1I)

$FN/\epsilon=2927$ (2I)

$FN/EXP1=0.084$ (3I)

$D2/FL=0.457$ (4I)

$FLG1/FL=0.979$ (5I)

$FLG2/FL=-0.434$ (6I)

$D1/D0=0.680$ (7I)

$v1-vs=60.220$ (8I)

$v11-vs1=60.220$ (9I)

$v12-vs2=17.400$ (10I)

$|RG2/RG1|=1.997$ (11I)

$NdG2=1.721$ (12I)

$vdG1=81.540$ (13I)

$FLG3b/FLG3a=4.499$ (14I)

$NdG3=1.850$ (15I)

$vdG3=32.270$ (16I)

$Ha/Hi=0.459$ (17I)

$(Ea-Ec)/FL=-0.036$ (18I)

FIG. 19A through FIG. 19E are aberration diagrams of the tube lens 90 exemplified in FIG. 18, and show aberrations on the imaging plane in a case when the parallel light beam is incident from the object side. The types of these aberration diagrams are similar to those in example 1.

What is claimed is:
1. A tube lens that is for a microscope and that forms an enlarged image of an object by being combined with an infinity-corrected objective, the tube lens comprising in an order from an object side:

a first lens group that has positive power and that includes a cemented lens;
a second lens group that has negative power; and
a third lens group that consists of a plurality of lenses each having positive power and that has positive power as a whole, wherein
a following condition expression is satisfied, where FL is a focal length of the tube lens and D2 is a distance from a lens surface that is closest to the object in the tube lens to a position of an entrance pupil of the tube lens:

0.3<$D2$/FL<1.3.

2. The tube lens according to claim 1, wherein
following condition expressions are satisfied, where FLG1 is a focal length of the first lens group, FLG2 is a focal length of the second lens group, D0 is a distance from a lens surface that is closest to the object in the tube lens to an imaging plane, on which the enlarged image is formed, and D1 is a distance from a lens surface that is closest to the object in the tube lens to a lens surface that is closest to the imaging plane in the tube lens:

0.3<FLG1/FL<3;

−4<FLG2/FL<−0.05; and 0.3<$D1$/$D0$<0.8.

3. The tube lens according to claim 1, wherein
the first lens group includes a first lens having a concave surface facing toward an image side, and
the second lens group includes a second lens having a concave surface facing toward an object side.

4. The tube lens according to claim 3, wherein
the first lens is a meniscus lens that is arranged closest to an image plane in the first lens group, that has a concave surface facing toward an image side, and that includes a single lens or a cemented lens, and
the second lens is a meniscus lens that is arranged closest to the object in the second lens group, that has a concave surface facing toward an object side, and that includes a single lens or a cemented lens.

5. The tube lens according to claim 4, wherein
the first lens and the second lens include at least four lenses in total, and
at least one of the first lens and the second lens includes a cemented lens.

6. The tube lens according to claim 5, wherein
the first lens and the second lens are cemented lenses, respectively.

7. The tube lens according to claim 4, wherein
at least one of the first lens and the second lens is a cemented lens including a lens having positive power and a lens having negative power, and
a following condition expression is satisfied, where ν1 is a highest Abbe number among Abbe numbers of lenses with positive power included in the cemented lens and νs is a lowest Abbe number among Abbe numbers of lenses with negative power included in the cemented lens:

30<ν1−νs.

8. The tube lens according to claim 6, wherein
the first lens and the second lens are cemented lenses each including a lens having positive power and a lens having negative power, and
following condition expressions are satisfied, where ν11 is a highest Abbe number among Abbe numbers of lenses with positive power included in a first cemented lens, which is one of the first lens and the second lens, νs1 is a lowest Abbe number among Abbe numbers of lenses with negative power included in the first cemented lens, ν12 is a highest Abbe number among Abbe numbers of lenses with positive power included in a second cemented lens, which is the other one of the first lens and the second lens, and νs2 is a lowest Abbe number among Abbe numbers of lenses with negative power included in the second cemented lens:

30<ν11−νs1; and

25<ν12−νs2.

9. The tube lens according to claim 3, wherein
following condition expressions are satisfied, where RG1 is a curvature radius of the concave surface of the first lens facing toward an image side, RG2 is a curvature radius of the concave surface of the second lens facing toward an object side, NdG2 is a refractive index with respect to d line of the second lens or a refractive index with respect to d line of a lens closest to the object among lenses constituting the second lens, and νdG1 is a highest Abbe number among Abbe numbers of lenses with positive power included in the first lens group:

0<|$RG2$/$RG1$|<3;

1.5<$NdG2$; and

70<ν$dG1$.

10. The tube lens according to claim 1, wherein
the third lens group includes a meniscus lens with positive power having a concave surface facing toward an object side.

11. The tube lens according to claim 1, wherein
the third lens group comprises:
a third lens with positive power that is arranged closest to the object; and
a fourth lens with positive power that is arranged closest to an image plane, and
a following condition expression is satisfied, where FLG3a is a focal length of the third lens and FLG3b is a focal length of the fourth lens:

0.2<FLG3$b$/FLG3$a$<5.

12. The tube lens according to claim 1, wherein
following condition expressions are satisfied, where NdG3 is a highest refractive index among refractive indexes of lenses included in the third lens group and νdG3 is a lowest Abbe number among Abbe numbers of lenses included in the third lens group:

1.7<$NdG3$; and

ν$dG3$<45.

13. The tube lens according to claim 1, wherein
a following condition expression is satisfied, where Ha is a height of an off-axis principal ray when the off-axis principal ray is incident on a lens surface closest to the object in the tube lens and Hi is a height of the off-axis principal ray when the off-axis principal ray is incident on an imaging plane:

0.3<$Ha$/$Hi$<1.

14. The tube lens according to claim 1, wherein
a following condition expression is satisfied, where Ea is a maximum effective diameter of a lens included in the first lens group and Ec is a maximum effective diameter of a lens included in the third lens group:

$-0.04 < (Ea-Ec)/FL < 0.03$.

15. A microscope apparatus comprising
a tube lens according to claim 1.

16. A microscope apparatus according to claim 15, further comprising
an image pickup element that picks up the enlarged image of the object formed by the tube lens, wherein
a following condition expression is satisfied, where L is a pixel size of the image pickup element:

$1 \mu m \leq L \leq 17 \mu m$.

17. An image pickup optical system comprising:
an infinity-corrected objective; and
a microscope tube lens, wherein
the microscope tube lens includes in an order from an object side:
  a first lens group that has positive power and that includes a cemented lens;
  a second lens group that has negative power; and
  a third lens group that consists of a plurality of lenses each having positive power and that has positive power as a whole, and
a following condition expression is satisfied, where FL is a focal length of the tube lens and D2 is a distance from a lens surface that is closest to an object in the tube lens to a position of an entrance pupil of the tube lens:

$0.3 < D2/FL < 1.3$.

* * * * *